US012688422B2

(12) United States Patent (10) Patent No.: US 12,688,422 B2
Zafrir et al. (45) Date of Patent: Jul. 21, 2026

(54) GENERATING PRETRAINED SPARSE STUDENT MODEL FOR TRANSFER LEARNING

(71) Applicant: Intel Corporation, Santa Clara, CA (US)

(72) Inventors: Ofir Zafrir, Zichron Ya'akov (IL); Guy Boudoukh, Ramat Hasharon (IL); Ariel Lahrey, Haifa (IL); Moshe Wasserblat, Maccabim (IL); Haihao Shen, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/934,276

(22) Filed: Sep. 22, 2022

(65) Prior Publication Data

US 2023/0010142 A1 Jan. 12, 2023

(51) Int. Cl.
*G06N 3/082* (2023.01)
*G06N 3/045* (2023.01)
(52) U.S. Cl.
CPC ............. *G06N 3/082* (2013.01); *G06N 3/045* (2023.01)
(58) Field of Classification Search
None
See application file for complete search history.

(56) References Cited

PUBLICATIONS

Zafrir et al., Prune Once for All: Sparse Pre-Trained Language Models, arXiv:2111.05754v1 [cs.CL] Nov. 10, 2021; Total pp. 12 (Year: 2021).*
Aghli et al., Combining Weight Pruning and Knowledge Distillation For CNN Compression; Computer Vision Foundation (CVF) 2021 ; Total pp. 8 (Year: 2021).*
Kim et al., PQK: Model Compression via Pruning, Quantization, and Knowledge Distillation; arXiv:2106.14681v1 [cs.LG] Jun. 25, 2021; Total pp. 5 (Year: 2021).*
Park et al., Prune Your Model Before Distill It; arXiv:2109.14960v3 [cs.LG] Jul. 25, 2022; Total pp. 27 (Year: 2022).*

* cited by examiner

*Primary Examiner* — Alan Chen
(74) *Attorney, Agent, or Firm* — Akona IP PC

(57) ABSTRACT

A student model may be trained in two stages by using two teacher models, respectively. The first teacher model has been trained with a pretraining dataset. The second teacher model has been trained with a training dataset that is specific to a task to be performed by the student model. In the first stage, the student model may be generated based on a structure of the first teacher model. Internal parameters of the student model are adjusted through a pretraining process based on the first teacher model and the pretraining dataset. Weights of the student model may be pruned during the pretraining process. In the second stage, a sparsity mask is generated for the student model to lock the sparsity pattern generated from the first stage. Further, some of the internal parameters of the student model are modified based on the second teacher model and the training dataset.

25 Claims, 8 Drawing Sheets

500

Generate a target neural network based on a first support neural network
510

Modify magnitudes of weights in the target neural network based on the first support neural network and a first training dataset
520

Prune one or more weights in the target neural network by changing magnitudes of the one or more weights to zero
530

After pruning the one or more weights in the target neural network, further modify magnitudes of a subset of the weights in the target neural network based on a second support neural network and a second training dataset, wherein the subset of the weights does not include the one or more weights
540

DNN 100

Convolutional Layer 110

Pooling Layer 120

Fully Connected Layer 130

Object 115

Object 125

Object 135

Input Image 105

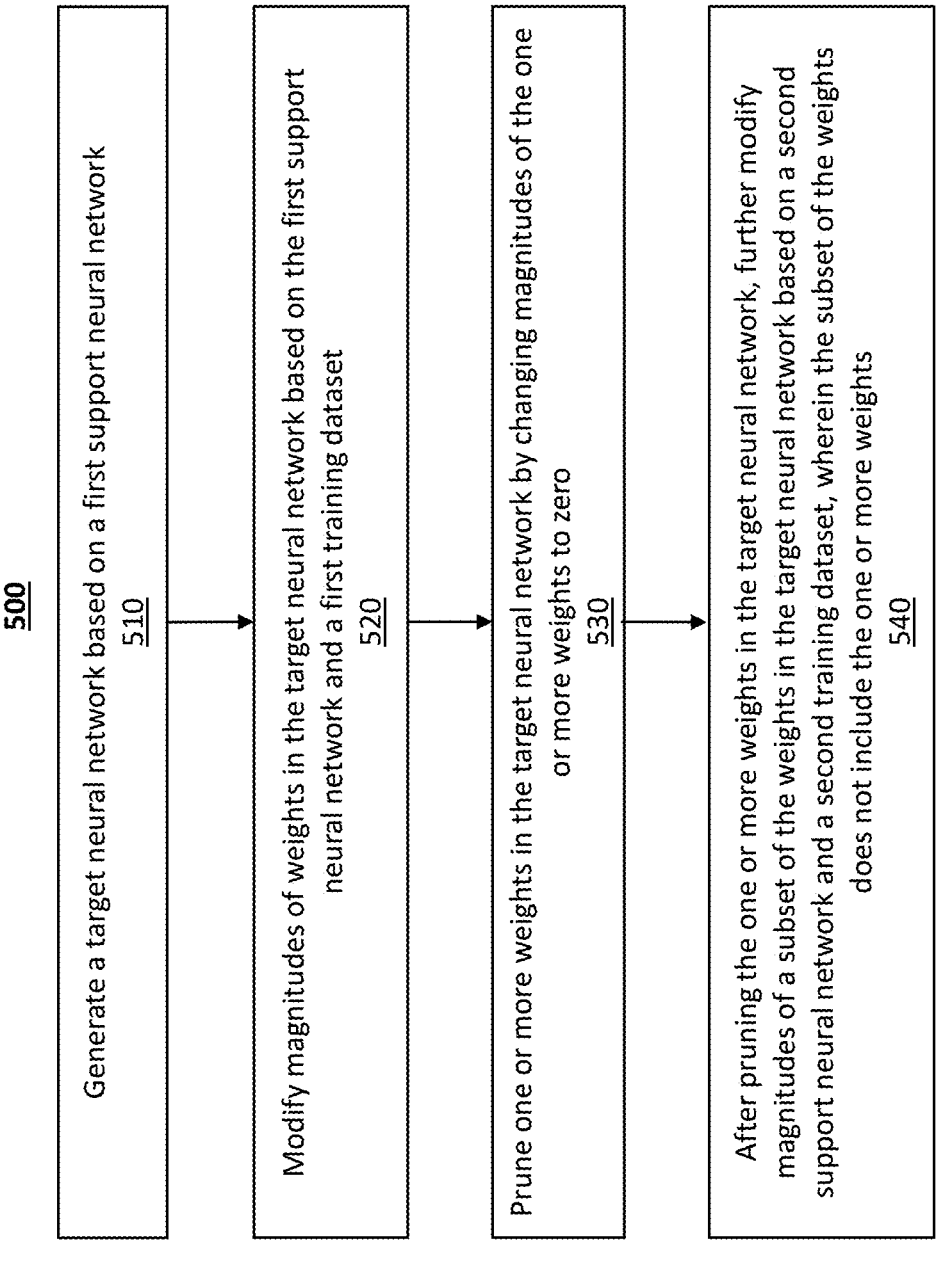

500

Generate a target neural network based on a first support neural network
510

Modify magnitudes of weights in the target neural network based on the first support neural network and a first training dataset
520

Prune one or more weights in the target neural network by changing magnitudes of the one or more weights to zero
530

After pruning the one or more weights in the target neural network, further modify magnitudes of a subset of the weights in the target neural network based on a second support neural network and a second training dataset, wherein the subset of the weights does not include the one or more weights
540

FIG. 5

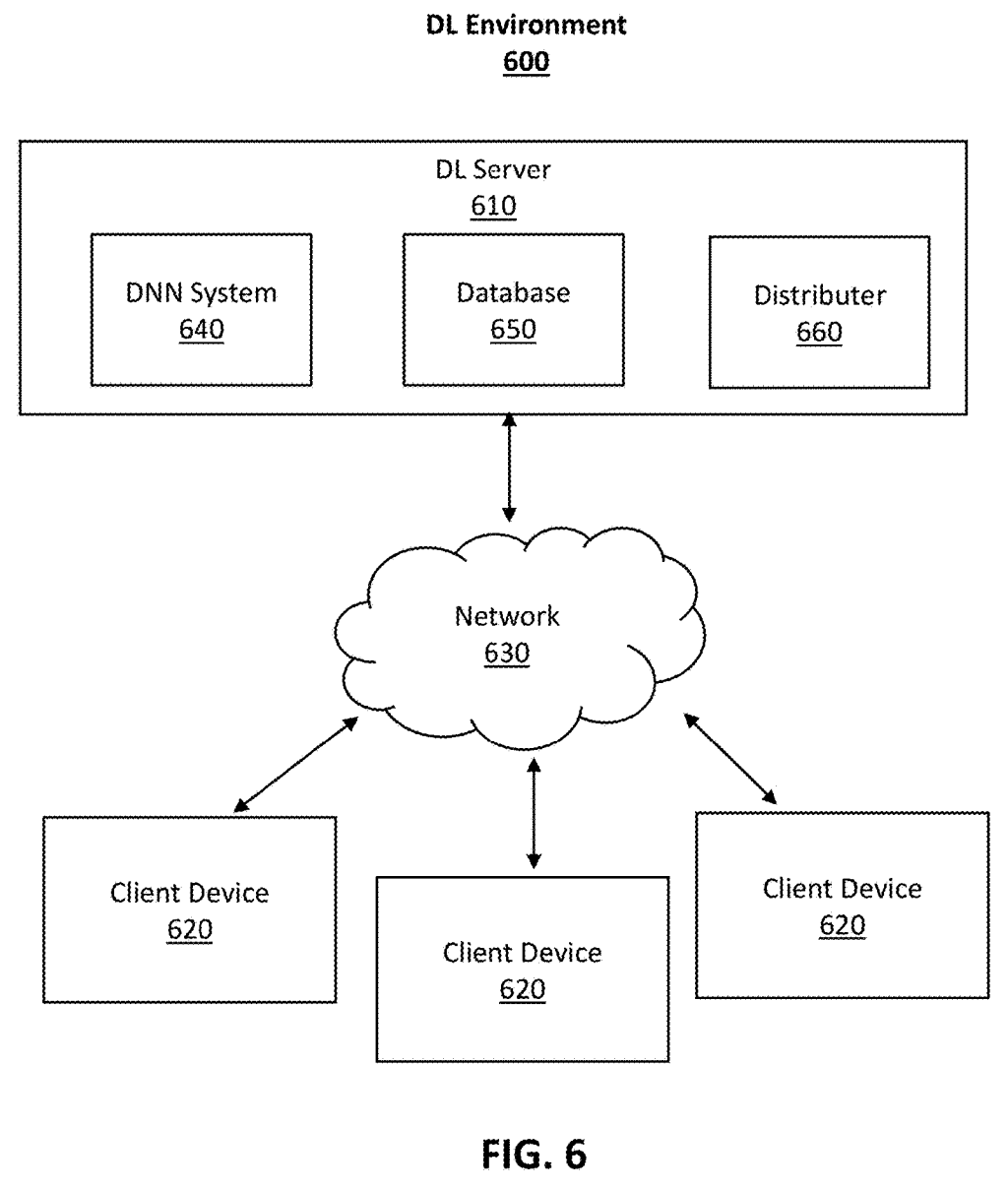

DL Environment
600

DL Server
610

| DNN System 640 | Database 650 | Distributer 660 |

Network
630

Client Device
620

Client Device
620

Client Device
620

FIG. 6

GENERATING PRETRAINED SPARSE STUDENT MODEL FOR TRANSFER LEARNING

TECHNICAL FIELD

This disclosure relates generally to neural networks, and more specifically, to generating pretrained sparse student models for transfer learning.

BACKGROUND

Deep neural networks (DNNs) are used extensively for a variety of artificial intelligence applications ranging from computer vision to speech recognition and natural language processing due to their ability to achieve high accuracy. However, the high accuracy comes at the expense of significant computation cost. DNNs have extremely high computing demands as each inference can require hundreds of millions of MAC (multiply-accumulate) operations as well as hundreds of millions of weight operand weights to be stored for classification or detection. Therefore, techniques to improve efficiency of DNNs are needed.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 5 is a flowchart showing a method of training a DNN, in accordance with various embodiments.

FIG. 6 illustrates a deep learning (DL) environment, in accordance with various embodiments.

DETAILED DESCRIPTION

Overview

Figure 1:
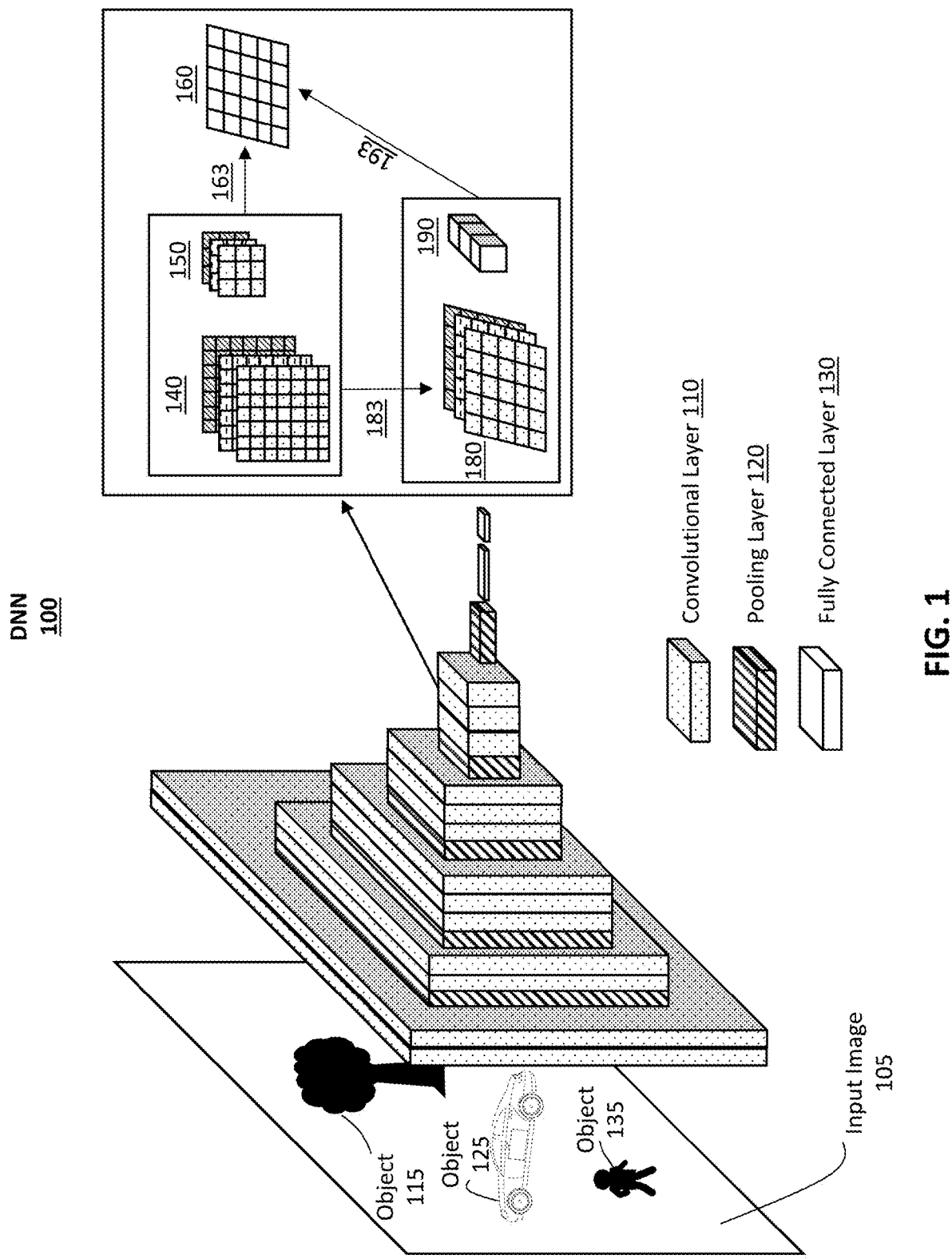
FIG. 1 illustrates layer architecture of an example DNN, in accordance with various embodiments.

DNNs are widely used in the domains of computer vision, speech recognition, natural language processing, image, and video processing mainly due to their ability to achieve beyond human-level accuracy. However, the improvements in accuracy come at the expense of significant computation cost. The underlying DNNs have extremely high computing demands as each input requires at least hundreds of millions of MAC operations as well as hundreds of millions of weight operand weights to be processed for classification or detection. Energy constrained mobile systems and embedded systems, where energy and area budgets are extremely limited, often use area and energy efficient DNN accelerators as the underlying hardware for executing machine learning applications.

Knowledge distillation is one of the solutions that provides a teacher-student training framework to train a compact, computationally efficient DNN model having improved predication accuracy compared to the standard training. Another solution is pruning weights in DNN layers to reduce complexity of DNN models. Sparse models have a smaller memory footprint and can be accelerated during inference making such models desirable and easier to deploy in production environments. However, pruning weights of neural networks to a high sparsity ratio while retraining the accuracy of the counterpart dense model have proven to be a difficult task.

Currently available technologies have used gradual pruning of weights according to some heuristic method combined with knowledge distillation from a fully trained teacher model. There are also technologies that prune a pre-trained model first and then fine-tune the sparse pretrained model after the pruning process. However, these technologies often prune teacher models to relatively low sparsity ratio (e.g., the ratio of the number of zero valued weights to the total number of weights is relatively low) to retain accuracy of the teacher models, which fail to provide sufficient model compression. Therefore, improved technology for knowledge distillation and pruning is needed.

Embodiments of the present disclosure may improve on at least some of the challenges and issues described above by providing methods and apparatus that facilitate a two-stage training of DNNs. In various embodiments of the present disclosure, a target neural network can be trained in two stages with two sets of training data and two support neural networks, respectively. The target neural network (e.g., a student model) is trained for performing machine learning tasks, e.g., language modeling tasks. The target neural network may have sufficient sparsity to be executed on an edge device. A support neural network (e.g., a teacher model) has been trained, and the knowledge learnt by the support neural network can be injected into the target neural network.

In an example of the first training stage, a first teacher model can be generated by fine-tuning a guidance model. The guidance model may be a trained DNN and may have been trained for a type of machine learning task, e.g., language modeling or other types. The guidance model may be fine-tuned with a pretraining dataset. The pretraining dataset may include one or more large-scale corpora, such as one or more large text data sets. The first teacher model may have the same layer architecture as the guidance model, e.g., same layers arranged in the same sequence.

Further, a student model (e.g., a student model) can be generated, e.g., by copying the teacher model. The student model may have the same layer architecture as the first teacher model. Initial values of internal parameters (e.g., weights) of the student model may be the same as those of the first teacher model. The initial values of the internal parameters in student model may be changed through knowledge distillation from the first teacher model. The pretraining may be done with a pretraining data set, which may be the same dataset used for fine-tuning the guidance model to generate the first teacher model. During the processing of pretraining the student model, internal parameters of the student model can be updated based on one or more outputs of the first teacher model, ground-truth labels of pretraining samples in the pretraining dataset, or both. At least some of the internal parameters may further be updated, e.g., be changed to zero, through pruning. The student model may be gradually pruned till a target sparsity ratio is reached. The target sparsity ratio can be relatively high, such as 70%, 80%, 90%, etc. The pruning process and the pretraining process may happen in parallel. For instance, the pretraining process may include a sequence of training steps. After every certain number of training steps, one of the pruning processes can be performed.

The first stage produces a pretrained sparse student model. As the internal parameters of the first teacher model remain the same and are not pruned during the process of pretraining the student model, the first teacher model can still have good accuracy gained from the fine-tuning process. The student model can benefit from the good accuracy of the first teacher model through the knowledge distillation in the pretraining process, even though the internal parameters of the student model are pruned.

In an example of the second stage, the student model is further trained through transfer learning, e.g., by using a second teacher model and a training dataset. The second teacher model and the second training dataset may be tailored to one or more specific machine learning task to be performed by the student model after the second stage is done. For instance, the second training dataset may be selected based on a specific task, and the second teacher model has been trained with the second training dataset. Also, sparsity masks are generated and applied to the student model to lock sparsity patterns in layers in the student model. With the sparsity masks, magnitudes of weights in the student model that were pruned in the first stage will remain zero during the second stage. After the sparsity masks are applied to the student model, internal parameters of the student model can be updated based on knowledge in the second teacher model and data in the second training dataset. Due to the presence of the sparsity masks, the sparsity ratio of the student model after the second stage may be the same or at least sufficiently similar as the sparsity ratio of the student model before the second stage. As the student model keeps its high sparsity ratio and also receive knowledge from the unpruned teacher models, the present disclosure provides a method to provide a scalable solution to produce sparse task-specific models with minimal accuracy loss.

For purposes of explanation, specific numbers, materials and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value based on the input operand of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the input operand of a particular value as described herein or as known in the art.

In addition, the terms "comprise," "comprising," "include," "including," "have," "having" or any other variation thereof, are intended to cover a non-exclusive inclusion. For example, a method, process, device, or DNN accelerator that comprises a list of elements is not necessarily limited to only those elements but may include other elements not expressly listed or inherent to such method, process, device, or DNN accelerators. Also, the term "or" refers to an inclusive "or" and not to an exclusive "or."

The DNN systems, methods and devices of this disclosure each have several innovative aspects, no single one of which is solely responsible for all desirable attributes disclosed herein. Details of one or more implementations of the subject matter described in this specification are set forth in the description below and the accompanying drawings.

Example DNN

FIG. 1 illustrates layer architecture of an example DNN 100, in accordance with various embodiments. For purpose of illustration, the DNN 100 in FIG. 1 is a convolutional neural network (CNN) trained to receive images and output classifications of objects in the images. In other embodiments, the DNN 100 may be other types of DNNs or trained for performing other types of tasks, e.g., language modeling, and so on. The DNN 100. In the embodiments of FIG. 1, the DNN 100 receives an input image 105 that includes objects 115, 125, and 135. The DNN 100 includes a sequence of layers comprising a plurality of convolutional layers 110 (individually referred to as "convolutional layer 110"), a plurality of pooling layers 120 (individually referred to as "pooling layer 120"), and a plurality of fully connected layers 130 (individually referred to as "fully connected layer 130"). In other embodiments, the DNN 100 may include fewer, more, or different layers. In an inference of the DNN 100, the layers of the DNN 100 execute tensor computation that includes many tensor operations, such as convolution (e.g., multiply-accumulate (MAC) operations, etc.), pooling operations, elementwise operations (e.g., elementwise addition, elementwise multiplication, etc.), other types of tensor operations, or some combination thereof.

The convolutional layers 110 summarize the presence of features in the input image 105. The convolutional layers 110 function as feature extractors. The first layer of the DNN 100 is a convolutional layer 110. In an example, a convolutional layer 110 performs a convolution on an input tensor 140 (also referred to as input feature map (IFM) 140) and a filter 150. As shown in FIG. 1, the IFM 140 is represented by a 7×7×3 three-dimensional (3D) matrix. The IFM 140 includes 3 input channels, each of which is represented by a 7×7 two-dimensional (2D) matrix. The 7×7 2D matrix includes 7 input elements (also referred to as input points) in each row and 7 input elements in each column. The filter 150 is represented by a 3×3×3 3D matrix. The filter 150 includes 3 kernels, each of which may correspond to a different input channel of the IFM 140. A kernel is a 2D matrix of weights, where the weights are arranged in columns and rows. A kernel can be smaller than the IFM. In the embodiments of FIG. 1, each kernel is represented by a 3×3 2D matrix. The 3×3 kernel includes 3 weights in each row and 3 weights in each column. Weights can be initialized and updated by backpropagation using gradient descent. The magnitudes of the weights can indicate importance of the filter 150 in extracting features from the IFM 140.

The convolution includes MAC operations with the input elements in the IFM 140 and the weights in the filter 150. The convolution may be a standard convolution 163 or a depthwise convolution 183. In the standard convolution 163, the whole filter 150 slides across the IFM 140. All the input channels are combined to produce an output tensor 160 (also referred to as output feature map (OFM) 160). The OFM 160 is represented by a 5×5 2D matrix. The 5×5 2D matrix includes 5 output elements (also referred to as output points) in each row and 5 output elements in each column. For purpose of illustration, the standard convolution includes one filter in the embodiments of FIG. 1. In embodiments where there are multiple filters, the standard convolution may produce multiple output channels in the OFM 160.

The multiplication applied between a kernel-sized patch of the IFM 140 and a kernel may be a dot product. A dot product is the elementwise multiplication between the kernel-sized patch of the IFM 140 and the corresponding kernel, which is then summed, always resulting in a single value. Because it results in a single value, the operation is often referred to as the "scalar product." Using a kernel smaller than the IFM 140 is intentional as it allows the same kernel (set of weights) to be multiplied by the IFM 140 multiple times at different points on the IFM 140. Specifically, the kernel is applied systematically to each overlapping part or kernel-sized patch of the IFM 140, left to right, top to bottom. The result from multiplying the kernel with the IFM 140 one time is a single value. As the kernel is applied multiple times to the IFM 140, the multiplication result is a 2D matrix of output elements. As such, the 2D output matrix (i.e., the OFM 160) from the standard convolution 163 is referred to as an OFM.

In the depthwise convolution 183, the input channels are not combined. Rather, MAC operations are performed on an individual input channel and an individual kernel and produce an output channel. As shown in FIG. 1, the depthwise convolution 183 produces a depthwise output tensor 180. The depthwise output tensor 180 is represented by a 5×5×3 3D matrix. The depthwise output tensor 180 includes 3 output channels, each of which is represented by a 5×5 2D matrix. The 5×5 2D matrix includes 5 output elements in each row and 5 output elements in each column. Each output channel is a result of MAC operations of an input channel of the IFM 140 and a kernel of the filter 150. For instance, the first output channel (patterned with dots) is a result of MAC operations of the first input channel (patterned with dots) and the first kernel (patterned with dots), the second output channel (patterned with horizontal strips) is a result of MAC operations of the second input channel (patterned with horizontal strips) and the second kernel (patterned with horizontal strips), and the third output channel (patterned with diagonal stripes) is a result of MAC operations of the third input channel (patterned with diagonal stripes) and the third kernel (patterned with diagonal stripes). In such a depthwise convolution, the number of input channels equals the number of output channels, and each output channel corresponds to a different input channel. The input channels and output channels are referred to collectively as depthwise channels. After the depthwise convolution, a pointwise convolution 193 is then performed on the depthwise output tensor 180 and a 1×1×3 tensor 190 to produce the OFM 160.

The OFM 160 is then passed to the next layer in the sequence. In some embodiments, the OFM 160 is passed through an activation function. An example activation function is the rectified linear activation function (ReLU). ReLU is a calculation that returns the value provided as input directly, or the value zero if the input is zero or less. The convolutional layer 110 may receive several images as input and calculate the convolution of each of them with each of the kernels. This process can be repeated several times. For instance, the OFM 160 is passed to the subsequent convolutional layer 110 (i.e., the convolutional layer 110 following the convolutional layer 110 generating the OFM 160 in the sequence). The subsequent convolutional layers 110 performs a convolution on the OFM 160 with new kernels and generates a new feature map. The new feature map may also be normalized and resized. The new feature map can be kernelled again by a further subsequent convolutional layer 110, and so on.

In some embodiments, a convolutional layer 110 has 4 hyperparameters: the number of kernels, the size F of kernels (e.g., a kernel is of dimensions F×F×D pixels), the S step with which the window corresponding to the kernel is dragged on the image (e.g., a step of one means moving the window one pixel at a time), and the zero-padding P (e.g., adding a black contour of P pixels thickness to the input image of the convolutional layer 110). The convolutional layers 110 may perform various types of convolutions, such as 2-dimensional convolution, dilated or atrous convolution, spatial separable convolution, depthwise separable convolution, transposed convolution, and so on. The DNN 100 includes 16 convolutional layers 110. In other embodiments, the DNN 100 may include a different number of convolutional layers.

The pooling layers 120 down-sample feature maps generated by the convolutional layers, e.g., by summarizing the presence of features in the patches of the feature maps. A pooling layer 120 is placed between 2 convolution layers 110: a preceding convolutional layer 110 (the convolution layer 110 preceding the pooling layer 120 in the sequence of layers) and a subsequent convolutional layer 110 (the convolution layer 110 subsequent to the pooling layer 120 in the sequence of layers). In some embodiments, a pooling layer 120 is added after a convolutional layer 110, e.g., after an activation function (e.g., ReLU) has been applied to the OFM 160.

A pooling layer 120 receives feature maps generated by the preceding convolution layer 110 and applies a pooling operation to the feature maps. The pooling operation reduces the size of the feature maps while preserving their important characteristics. Accordingly, the pooling operation improves the efficiency of the DNN and avoids over-learning. The pooling layers 120 may perform the pooling operation through average pooling (calculating the average value for each patch on the feature map), max pooling (calculating the maximum value for each patch of the feature map), or a combination of both. The size of the pooling operation is smaller than the size of the feature maps. In various embodiments, the pooling operation is 2×2 pixels applied with a stride of 2 pixels, so that the pooling operation reduces the size of a feature map by a factor of 2, e.g., the number of pixels or values in the feature map is reduced to one quarter the size. In an example, a pooling layer 120 applied to a feature map of 6×6 results in an output pooled feature map of 3×3. The output of the pooling layer 120 is inputted into the subsequent convolution layer 110 for further feature extraction. In some embodiments, the pooling layer 120 operates upon each feature map separately to create a new set of the same number of pooled feature maps.

The fully connected layers 130 are the last layers of the DNN. The fully connected layers 130 may be convolutional or not. The fully connected layers 130 receive an input operand. The input operand defines the output of the convolutional layers 110 and pooling layers 120 and includes the values of the last feature map generated by the last pooling layer 120 in the sequence. The fully connected layers 130 apply a linear combination and an activation function to the input operand and generate an individual partial sum. The individual partial sum may contain as many elements as there are classes: element i represents the probability that the image belongs to class i. Each element is therefore between 0 and 1, and the sum of all is worth one. These probabilities are calculated by the last fully connected layer 130 by using a logistic function (binary classification) or a softmax function (multi-class classification) as an activation function.

In some embodiments, the fully connected layers 130 classify the input image 105 and return an operand of size N, where N is the number of classes in the image classification problem. In the embodiments of FIG. 1, N equals 3, as there are 3 objects 115, 125, and 135 in the input image. Each element of the operand indicates the probability for the input image 105 to belong to a class. To calculate the probabilities, the fully connected layers 130 multiply each input element by weight, make the sum, and then apply an activation function (e.g., logistic if N=2, softmax if N>2). This is equivalent to multiplying the input operand by the matrix containing the weights. In an example, the individual partial sum includes 3 probabilities: a first probability indicating the object 115 being a tree, a second probability indicating the object 125 being a car, and a third probability indicating the object 135 being a person. In other embodiments where the input image 105 includes different objects or a different number of objects, the individual partial sum can be different.

Example Training System

Figure 2:
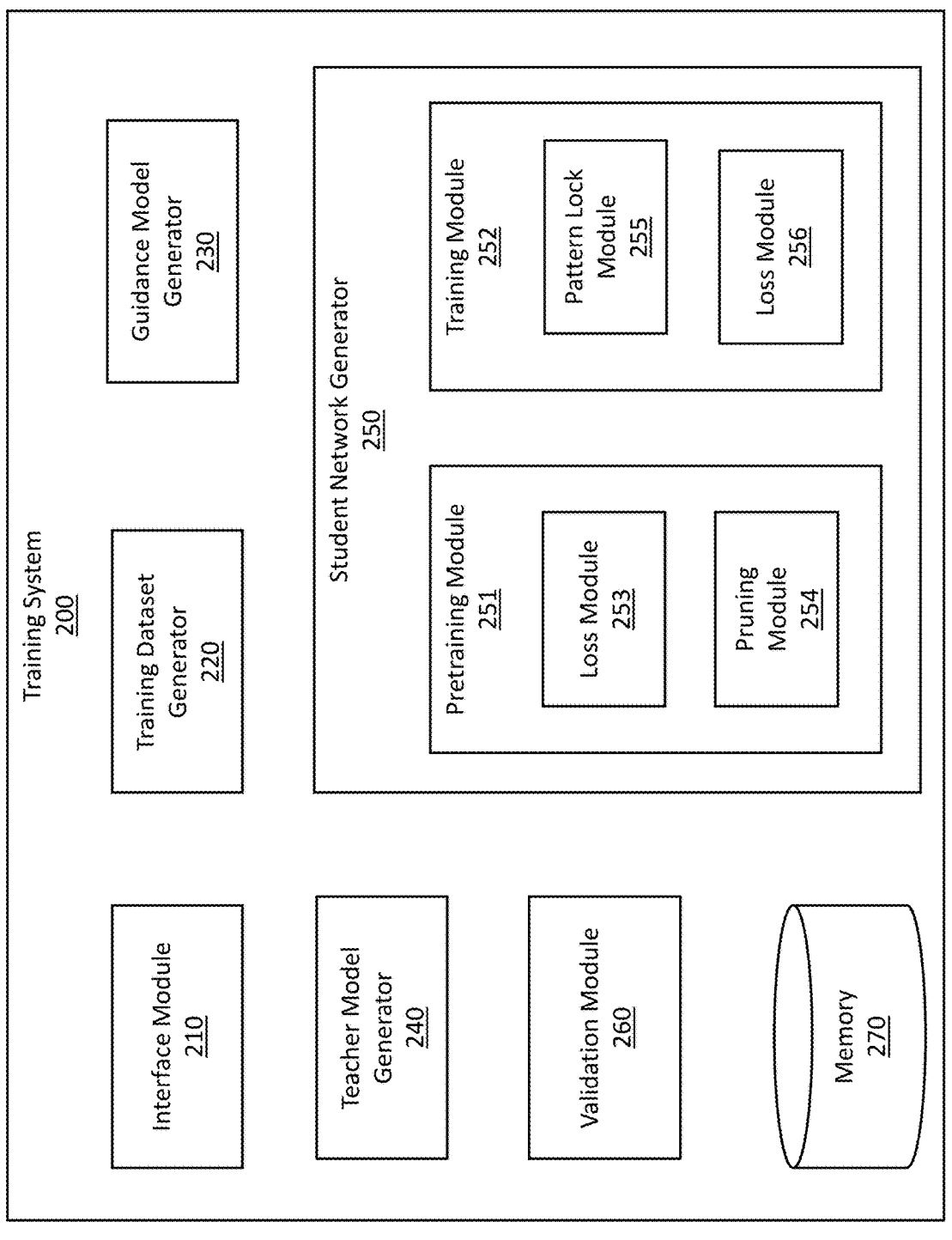
FIG. 2 is a block diagram of a training system, in accordance with various embodiments.

FIG. 2 is a block diagram of a training system 200, in accordance with various embodiments. The training system 200 trains DNNs by using knowledge distillation. A DNN can be used to perform one or more machine learning tasks. A machine learning task is a task of making an inference. The inference is a process of running available data into the DNN to generate an output, and the output provides a solution to a problem or question that is being asked. An example of the output is one or more numerical scores that can indicate a probability of an object in an image belonging to a category. The training system 200 can train DNNs that can be used to solve various problems, such as image classification, learning relationships between biological cells (e.g., DNA, proteins, etc.), control behaviors for devices (e.g., robots, machines, etc.), and so on.

The training system 200 includes an interface module 210, a training dataset generator 220, a guidance model generator 230, a teacher model generator 240, a student network generator 250, a validation module 260, and a memory 270. In other embodiments, alternative configurations, different or additional components may be included in the training system 200. For instance, the training system 200 may not include the guidance model generator 230 and may receive guidance models from another system. Further, functionality attributed to a component of the training system 200 may be accomplished by a different component included in the training system 200 or by a different system.

The interface module 210 facilitates communications of the training system 200 with other systems. For example, the interface module 210 establishes communications between the training system 200 with an external database to receive data that can be used to train DNNs, such as data used by the training dataset generator 220 to generate training samples and ground-truth labels of training samples. The interface module 210 may also receive data that can be input into DNNs to perform machine learning tasks. As another example, the interface module 210 supports the training system 200 to distribute DNNs (e.g., trained student models) to other systems, e.g., computing devices configured to apply the DNNs to perform tasks. The computing devices may be an edge device, a client device, and so on.

The training dataset generator 220 forms training datasets that will be used to train DNNs. A training dataset includes training samples and ground-truth labels. The training dataset may include one or more ground-truth labels for each training sample. A ground-truth label of a training sample may be a known or verified label that answers the problem or question that the DNN will be used to answer. In an example where a DNN is trained to recognize objects in images, the training dataset includes training images and ground-truth labels that indicate classifications of objects in the training images. A ground-truth label in the example may be a number that indicates a probability that an object belongs to a class. The object may be associated with other ground-truth labels that indicate probabilities that the object belongs to other classes. A training dataset may be referred to as a pretraining dataset, e.g., in embodiments where the training dataset is used to pretrain a sparse student model.

In some embodiments, the training dataset generator 220 may also form validation datasets for validating performance of trained DNNs by the validation module 260. A validation dataset may include validation samples and ground-truth labels of the validation samples. The validation dataset for a DNN may include different samples from the training dataset used for training the DNN. In an embodiment, a part of a training dataset may be used to initially train a DNN, and the rest of the training dataset may be held back as a validation subset used by the validation module 260 to validate performance of the trained DNN. The portion of the training dataset not including the validation subset may be used to train the DNN.

The guidance model generator 230 generates guidance models. A guidance model may be a DNN. A guidance model may be trained by a training dataset generated by the training dataset generator 220. The guidance model may be trained for a type of machine learning task, such as language modeling. A guidance model may be used to generate a teacher model that can be used to generate a sparse student model. In some embodiments, a performance of the guidance model may be validated by the validation module 260, e.g., before the guidance model is used to generate the teacher model.

In some embodiments, the guidance model generator 230 may generate a guidance model based on parameters that define the architecture of a DNN. Examples of the parameters include the number of layers, types of layers, sequence of layers, number of processing elements (PEs) in a layer, types of PEs, arrangement of PEs (e.g., interconnections between PEs, number of columns in a PE array, number of rows in a PE array, etc.) in a layer, activation function, pooling function, or other types of parameters. A PE may perform MAC operations. The architecture of a DNN includes an input layer, an output layer, and a plurality of hidden layers. The input layer of a DNN may include tensors (e.g., a multidimensional array) specifying attributes of the input image, such as the height of the input image, the width of the input image, and the depth of the input image (e.g., the number of bits specifying the color of a pixel in the input image). The output layer includes labels of objects in the input layer. The hidden layers are layers between the input layer and output layer. The hidden layers include one or more convolutional layers, one or more linear layers, one or more other types of layers (such as rectified liner unit (ReLU) layers, pooling layers, fully connected layers, normalization layers, softmax or logistic layers, etc.) and so on. An example DNN is the DNN 100 described above in conjunction with FIG. 1.

In some embodiments, the guidance model generator 230 determines some or all of the parameters, e.g., based on the type of machine learning tasks to be performed by the guidance model, resource available for training, resources available for inference, some other factors that may be critical to the architecture of the guidance model, or some combination thereof. In other embodiments, the guidance model generator 230 may receive some or all of the parameters from a different system (e.g., from a computing device that will run the pretrained network for inference, a system managing such computing devices, etc.) or from a user (e.g., through a user interface that allows the user to provide information of the guidance model).

The teacher model generator 240 generates teacher models to be used to train student models. A teacher model may be a DNN. In some embodiments, the teacher model generator 240 may generate a single teacher model for training a single student model or multiple student models, or may generate multiple teacher models to train a single student model. For instance, the teacher model generator 240 may generate two teacher models to train a student model in two stages, respectively. The teacher model generator 240 may generate a first teacher model based on a guidance model. The first teacher model may be used for pretraining the student model and can be generated with a pretraining dataset. The pretraining dataset may also be referred to as a tuning dataset. The teacher model generator 240 can generate the first teach model by fine-tune the guidance model with the tuning dataset. In some embodiments, the pretraining dataset includes one or more large-scale corpora. The teacher model generator 240 may input samples in the pretraining dataset into the guidance model and adjust internal parameters of the guidance model to minimize a difference between outputs of the guidance model and ground-truth labels of the training samples.

The teacher model generator 240 may also generate a second teacher model for further training the student model. The second teacher model may be different from the first teacher model. In some embodiments, the second teacher model is trained by using a training dataset that may be different from the pretraining dataset used for generating the first teacher model. The training dataset used for generating the second teacher model may be tailored to a specific machine learning task. The specific machine learning task may be a task to be performed by the student model. A specific machine learning task may be a specific type of language modeling task, such as natural language inference, language translation, question answering, text generation, and so on. In some embodiments, the teacher model generator 240 may obtain a dataset for each specific machine learning task. Examples of the data set include MNLI (Multi-Genre Natural Language Inference) corpus, SQuAD (Stanford Question Answering Dataset), and so on. The dataset may include a plurality of samples and ground-truth labels of the samples. The teacher model generator 240 may generate the dataset or instruct the training dataset generator 220 to generate the dataset. The teacher model generator 240 inputs the training dataset into the second teacher model and adjust internal parameters of the second teacher model by minimizing a loss between the outputs of the second teacher model and the ground-truth labels in the dataset.

The teacher model generator 240 may provide trained teacher models to the student network generator 250 that can use the trained teacher models to train student models through knowledge distillation. In some embodiments, the teacher model generator 240 may instruct the validation module 260 to validate accuracy of a teacher model before providing the teacher model to the student network generator 250.

The student network generator 250 generates student models, e.g., based on teacher models generated by the teacher model generator 240. A student model is a DNN that after trained, can be used to perform one or more specific machine learning tasks. In some embodiments, the student network generator 250 may generate a student model in two stages, e.g., a first stage of generating a pretrained sparse student model from a teacher model, and a second stage of further training the pretrained sparse student model. The second stage may include task-specific transfer learning. For instance, the second stage uses another teacher model that is tailored to the specific task and injects knowledge learnt by the teacher model for performing the specific task into the student model. The student network generator 250 includes a pretraining module 251 for performing the first stage and a training module 252 for performing the second stage.

The pretraining module 251 determines a layer architecture of the student model based on a layer architecture of the first teacher model. In some embodiments, the pretraining module 251 may use the layer architecture of the first teacher model as the layer architecture of the student model. For instance, the student model may include the same number and/or types of layers as a teacher model. The arrangement of the layers in the student model ("student layers") can be the same as the arrangement of the layers in the teacher model ("teacher layers"). Also, for an individual student layer, the pretraining module 251 may design the student layer based on a corresponding teacher layer. The pretraining module 251 may make the student layer mirror the corresponding teacher. For instance, the student layer can have the same number and/or types of PEs as the corresponding teacher layer. The arrangement of the PEs can also be the same in the two layers.

The pretraining module 251 also pretrains the student model with the first teacher model and a pretraining dataset. The pretraining dataset may have been used to train the first teacher model, e.g., by fine-tuning a guidance model. As shown in FIG. 2, the pretraining module 251 includes a loss module 253 and a pruning module 254. The loss module 253 can modify the internal parameters of the student model based on knowledge learnt by the first teacher model as well as data in the pretraining dataset. In some embodiments, the loss module 253 may modify the internal parameters of the student model to minimize a loss L. The loss L may be a norm loss $L_{norm}$, a cross-entropy $L_{ce}$, or a combination of both. The norm loss $L_{norm}$ may indicate a loss between the ground-truth labels and determinations made by the student model based on the training samples. The cross-entropy $L_{ce}$ may indicate a loss between one or more outputs of the first teacher model and one or more outputs of the student model. Alternatively or additionally, the cross-entropy $L_{ce}$ may indicate a loss between the ground-truth labels and determinations made by the student model based on the training samples. An output of the first teacher model may be an OFM of a teacher layer, such as a convolutional layer, linear layer, or other types of layer in the first teacher model. An output of the student model may be an OFM of a student layer. The student layer may correspond to the teacher layer, e.g., the student layer may be generated based on the teacher layer. In an embodiment, the loss L may be defined as:

$$L = a*L_{norm} + b*L_{ce}$$

where a and b are scaling scalers of $L_{norm}$ and $L_{ce}$, respectively.

The loss module 253 may also determine hyperparameters for the training process. Hyperparameters may be different from parameters inside the network (e.g., weights). In some embodiments, the hyperparameters include variables which determine how the student model is pretrained, such as batch size, number of epochs, etc. A batch size defines the number of training samples to work through before updating the parameters of the student model. The batch size is the same as or smaller than the number of samples in the training dataset. The training dataset can be divided into one or more batches. The number of epochs defines how many times the entire training dataset is passed forward and backwards through the entire network. The number of epochs defines the number of times that the DL algorithm works through the entire training dataset. One epoch means that each training sample in the training dataset has had an opportunity to update the parameters inside the network. An epoch may include one or more batches. The number of epochs may be 10, 100, 500, 1000, or even larger.

The pruning module 254 prunes weights in the student model. The pruning module 254 may operate in parallel with the loss module 253. For instance, after every certain number of training steps performed by the loss module 253, the pruning module 254 performs a pruning process to prune weights of the student model. Between the pruning processes performed by the pruning module 254, the magnitudes of weights may be updated by the loss module 253 based on the first teacher model and the pretraining set.

In some embodiments, the pruning module 254 may use magnitude pruning to prune weights. The pruning module 254 may prune weights at a layer level. In a magnitude pruning process, the pruning module 254 identifies one or more weights that have a relatively large magnitude, e.g., larger than an average weight magnitude of the layer. The remaining weights are pruned. For instance, the pruning module 254 sets the magnitudes of the remaining weights to zero. Alternatively, the pruning module 254 may identify one or more weights have relatively low magnitude (e.g., magnitude that is lower than the average weight magnitude of the layer) and prunes the identified weights. The pruning module 254 may repeat this magnitude pruning process till the sparsity ratio of the layer reaches a target sparsity ratio. Examples of the target sparsity ratio may be 70%, 75%, 80%, 85%, 90%, or a smaller or larger ratio.

In some embodiments, the pruning module 254 may perform multiple pruning steps and set step-specific target sparsity ratios. In an example, for f steps, the lowest magnitude weights are pruned until reaching a temporal sparsity ratio $s_t$ for time step t, which can be denoted as:

$$s_t = s_f + (s_i - s_f)\left(1 - \frac{t - t_s}{t_e - t_s}\right)$$

Where $s_i$ and $s_f$ are the initial and final sparsity ratios, and $t_e$ and $t_s$ are the pruning start and end time steps. After the end time step $t_e$, the pruning module 254 may move on to prune weights in the next layer that have learned weights.

In some embodiments, the pruning module 254 may prune weights at a multiple-layer level. For example, the pruning module 254 may identify lowest magnitude weights from multiple layers and set the target sparsity ratio or temporal sparsity ratio as a sparsity ratio of all these layers. In other embodiments, the pruning module 254 may prune weights at a network level. For example, the pruning module 254 may identify lowest magnitude weights from the whole student model and set the target sparsity ratio or temporal sparsity ratio as a sparsity ratio of all the layers in the student model. After the adjustment in magnitudes of weights of the student model is done by the loss module 253 and the pruning module 254, the student model becomes a pretrained sparse model and can be further trained by the training module 252. The pruning module 254 may also prune weights in other levels, e.g., a row level, a column level, a block level, a level of individual weights, and so on.

In some embodiments, the last non-zero magnitude of a pruned may be stored in a memory, and the pruned weight may come back to the student model, e.g., in embodiments where the last non-zero magnitude of the pruned weight is higher than the magnitude of an active weight. In some embodiments, a pruned weight may be updated in a training process, e.g., by the loss module 256, despite that the pruned weight has been pruned and may not affect an output of the student model.

The training module 252 trains the student model for a specific task based on the second teacher model and a training dataset. The second teacher model may be different from the first teacher model, e.g., it may have a different layer architecture or different internal parameters from the first teacher model. The training dataset may be different from the pretraining dataset. In an example, the pretraining may be a large-scale corpus, versus the training dataset may be tailored to one or more specific machine learning tasks to be performed by the student model after the second stage is done. Examples of specific machine learning tasks include natural language inference, language translation, question answering, text generation, and so on. The training module 252 includes a pattern lock module 255 and a loss module 256. The second teacher model may be trained for the one or more specific tasks, e.g., by using the training dataset.

The pattern lock module 255 generates sparsity masks for sparse layers in the student model. A sparse layer is a layer in which one or more weights have been pruned by the pruning module 254. The pattern lock module 255 may identify a sparsity pattern of the sparse layer, e.g., by identifying the pruned weights and unpruned weights in the sparse layer. In an example where the sparse layer is a convolutional layer, the sparsity mask may specify locations of the pruned weights in a convolutional kernel and lock the magnitude of the pruned weights so that their magnitude cannot be changed later. The sparse mask may also identify unpruned weights in the kernel. The pattern lock module 255 may generate sparsity masks for all sparse layers in the student model. Sparsity masks for different sparse layers may be different, e.g., as the sparsity patterns of these layers are different.

In an example, a sparsity masks $M^l$ for each sparse layer 1 with weight $W^l$, representing the layer's sparsity pattern, may be denoted as:

$$M_{uv}^l = \begin{cases} 1, & W_{uv}^l \neq 0 \\ 0, & W_{uv}^l = 0 \end{cases}$$

During training, the loss L gradient with respect to the weights is modified to:

$$\frac{\partial \mathcal{L}}{\partial W_{uv}^l} = \begin{cases} \dfrac{\partial \mathcal{L}}{\partial W_{uv}^l}, & M_{uv}^l = 1 \\ 0, & M_{uv}^l = 0 \end{cases}$$

ensuring that a weight that was initially zero will stay zero through-out the training process.

The loss module 256 modifies some of the internal parameters of the student model with the second teacher model and the training dataset. In some embodiments, the loss module 256 may modify the internal parameters of the student model to minimize a loss L. The loss L may be a norm loss $L_{norm}$, a cross-entropy $L_{ce}$, or a combination of both. The norm loss $L_{norm}$ may indicate a loss between determinations made by the student model based on the training samples in the training dataset the ground-truth labels of the training samples. The cross-entropy $L_{ce}$ may indicate a loss between one or more outputs of the student model and one or more outputs of the second teacher model. Alternatively or additionally, the cross-entropy $L_{ce}$ may indicate a loss between the ground-truth labels and determinations made by the student model based on the training samples.

An output of the second teacher model may be an OFM of a teacher layer, such as a convolutional layer, linear layer, or other layers in the second teacher model. An output of the student model may be an OFM of a student layer. The student layer may correspond to the second teacher layer, e.g., the student layer and the teacher layer may be the same type of layer (e.g., convolutional layer, linear layer, etc.) or the student layer and the teacher layer have the same positions (e.g., the last layer) in the student models and the second teacher models. In an embodiment, the loss L may be defined as:

$$L = a * L_{norm} + b * L_{ce}$$

where a and b are scaling scalers of $L_{norm}$ and $L_{ce}$, respectively. The loss module 256 may also determine hyperparameters for the training process.

Given the presence of the sparsity mask, the loss module 256 may not modify all the internal parameters in the second model during the training process. The sparsity mask prevents the loss module 256 from changing the magnitudes of pruned weights so that the magnitudes of these weights remain zero during the training process. The sparsity ratio of the student model, which is determined in the first stage, can be reserved in the second stage. In some embodiments, the sparsity ratio of the student model after the second stage may be the same or sufficiently similar as the sparsity ratio of the student model after the first stage but before the second stage. By preserving the sparsity ratio, the computing resources needed for executing the student model would remain the same or sufficient similar, so that the fully trained student model may still be executed by a device with limited computing resources, such as an edge device.

The validation module 260 verifies performance (e.g., accuracy) of trained DNNs, such as guidance models trained by the guidance model generator 230, teacher models trained by the teacher model generator 240, or student models trained by the training module 252. The validation module 260 may determine a performance score of a trained model and determines whether the performance score meets a threshold (e.g., a requirement for model performance). In response to determining that the performance score of the model meets the threshold, the validation module 260 may deploy the model to another component of the training system 200, or another system or device, e.g., through the interface module 210. In response to determining that the accuracy does not meet the threshold, the validation module 260 may request to further train the model till the accuracy meets the threshold.

In some embodiments, the validation module 260 inputs samples in a validation dataset into the model and uses the outputs of the model to determine the model accuracy. In some embodiments, a validation dataset may be formed of some or all the samples in the training dataset. Additionally or alternatively, the validation dataset includes additional samples, other than those in the training datasets. In some embodiments, the validation module 260 determines may determine an accuracy score measuring the precision, recall, or a combination of precision and recall of the model. The validation module 260 may use the following metrics to determine the accuracy score: Precision=TP/(TP+FP) and Recall=TP/(TP+FN), where precision may be how many the reference classification model correctly predicted (TP or true positives) out of the total it predicted (TP+FP or false positives), and recall may be how many the reference classification model correctly predicted (TP) out of the total number of objects that did have the property in question (TP+FN or false negatives). The F-score (F-score=2*PR/(P+R)) unifies precision and recall into a single measure.

The memory 270 stores data associated with the training system 200, such as data received, generated, or used by the training system 200. For instance, the memory 270 may store parameters (e.g., internal parameters, hyperparameters, etc.) of guidance models, teacher models, or student models. The memory 270 may also store training datasets and validation sets used to train and validate guidance models, teacher models, or student models. In some embodiments, the training system 200 may be associated with multiple memories. The memory 270 may include a random-access memory (RAM), such as a static RAM (SRAM), disk storage, nearline storage, online storage, offline storage, and so on.

Example Processes of Training Student Model

Figure 3:
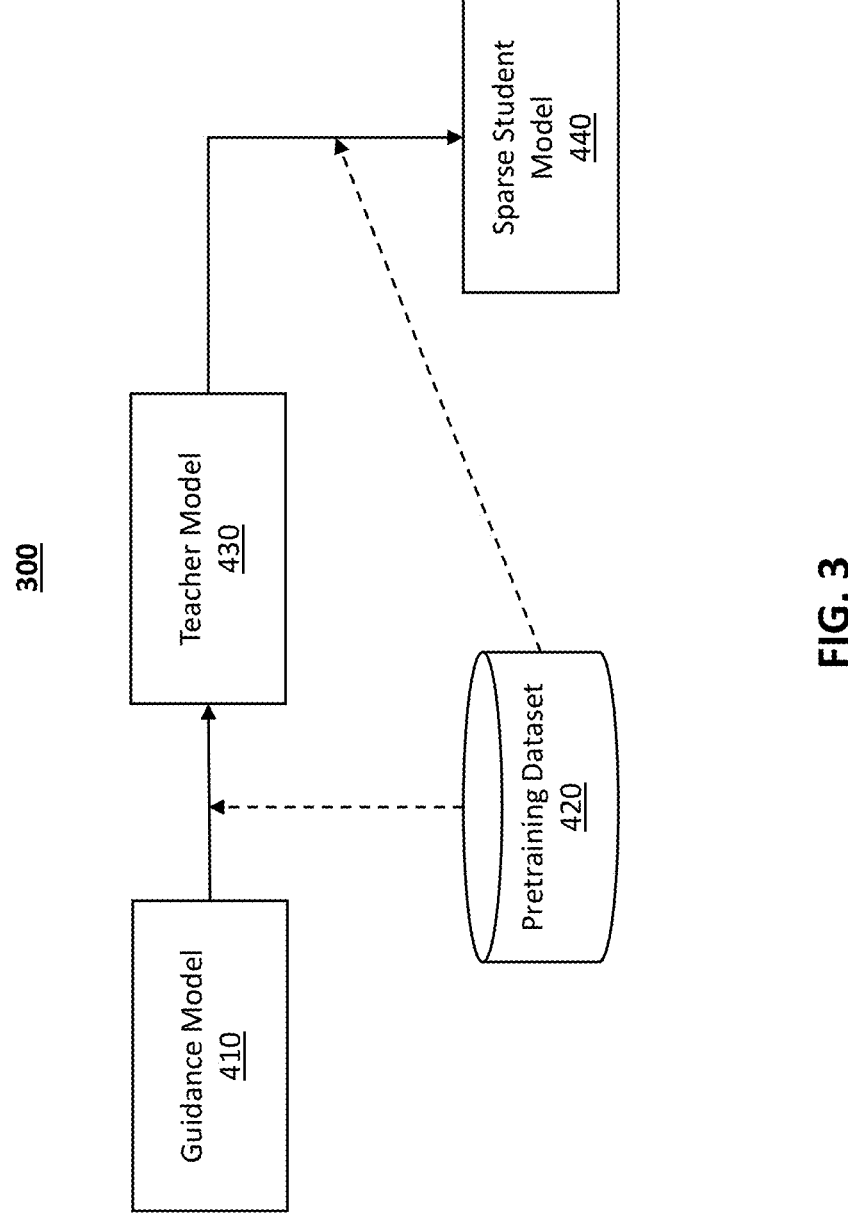
FIG. 3 illustrates an example process of generating a pretrained sparse student model, in accordance with various embodiments.

FIG. 3 illustrates an example process 300 of generating a pretrained sparse student model, in accordance with various embodiments. The process 300 may be a first stage of a two-stage training process. The process 300 may be at least partially performed by the pretraining module 251 in FIG. 2.

The process 300 in FIG. 3 starts with a guidance model 410. The guidance model 410 may be a DNN that has been trained for modeling language. The guidance model 410 may be trained with one or more large corpora, such as book corpus, online corpus, and so on. A pretraining dataset 420 is input into the guidance model 410 to fine-tune internal parameters of the guidance model 410 for generating a teacher model 430. The pretraining dataset 420 may be generated, e.g., by the training dataset generator 220. The teacher model 430 is generated through the fine-tuning process and may have the same layer architecture as but different internal parameters from the guidance model 410. The teacher model 430 is then used to generate a sparse student model 440.

In some embodiments, the sparse student model 440 is initialized by copying the teacher model 430. For instance, an initial version of the sparse student model 440 may have the same layer architecture and same internal parameters as the teacher model 430. The sparse student model 440 can be trained, e.g., the internal parameters of the sparse student model 440 can be updated, through knowledge distillation and pruning. The teacher model 430 and the pretraining dataset 420 may be used in the training process.

In an example, training samples in the pretraining dataset 420 are input into the sparse student model 440 and the teacher model 430 as inputs. The internal parameters of the sparse student model 440 may be updated to minimize a difference between one or more outputs of the sparse student model 440 and corresponding outputs of teacher model 430. An output of the sparse student model 440 may be an OFM of a layer in the sparse student model 440. The layer may be a convolutional layer, linear layer, or other types of layers. The internal parameters of the sparse student model 440 can be updated further based on ground-truth labels of the training samples by minimizing a difference between determinations made by the sparse student model 440 and the ground-truth labels.

Some of the internal parameters of the sparse student model 440 can also be changed through pruning. Through the pruning process, magnitudes of certain weights in the sparse student model 440 can be set to zero. In some embodiments, weights in the sparse student model 440 may be updated through multiple pruning processes till a predetermined sparsity ratio is reached. The pruning processes may occur in parallel with knowledge distillation during the training process. For instance, after every certain number of training steps, weights in the sparse student model 440 may be pruned. This can repeat till the sparse student model 440 is fully trained and the sparsity ratio of the sparse student model 440 reaches a target sparsity ratio. Through such an integrated process that includes both knowledge distillation and pruning, the sparse student model 440 obtains knowledge from the teacher model 430 but achieves a higher sparsity ratio than the teacher model 430. The sparse student model 440 may be referred to as a pretrained sparse student model, as it can be further trained.

Figure 4:
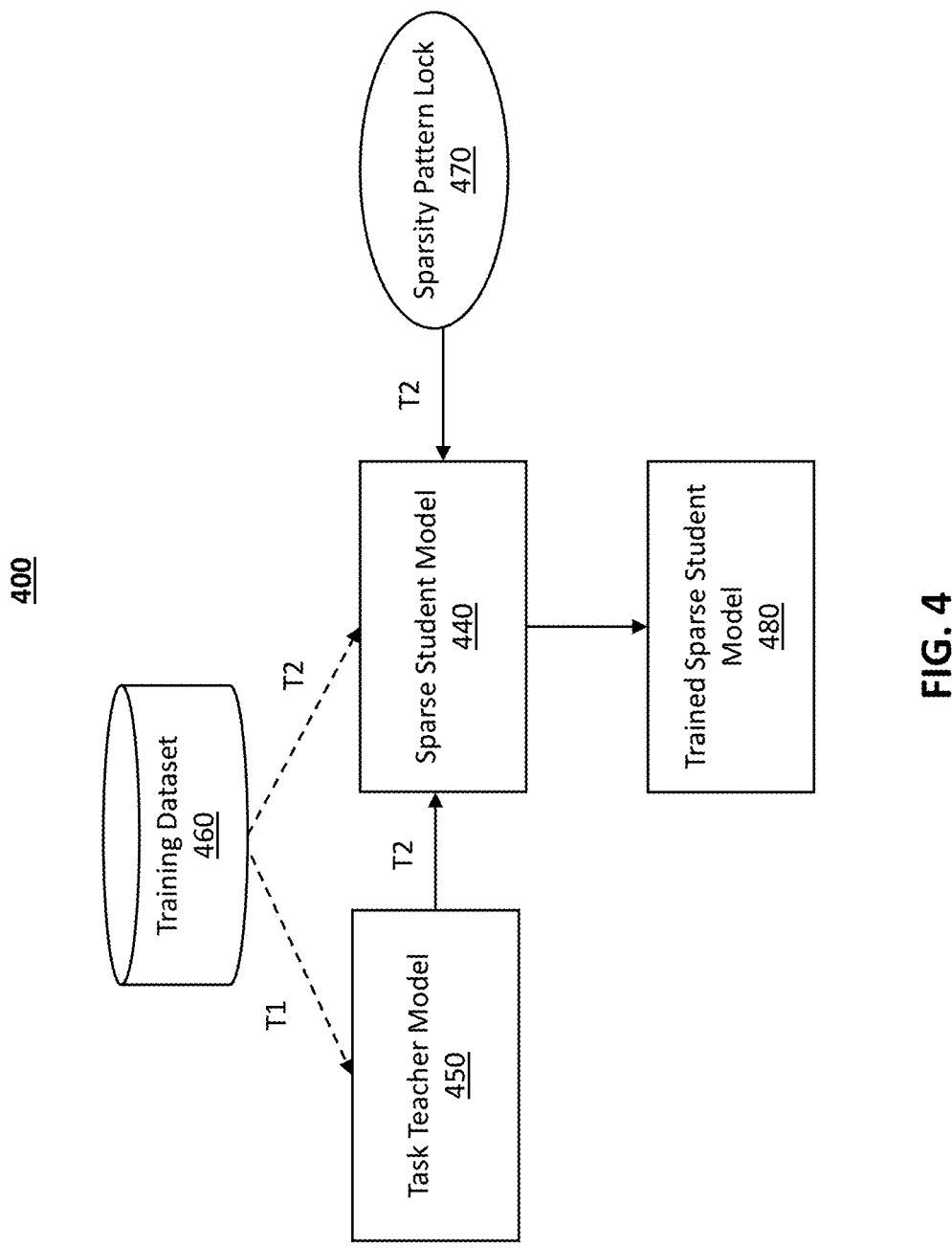
FIG. 4 illustrates an example process of training a pretrained sparse student model through transfer learning, in accordance with various embodiments.

FIG. 4 illustrates an example process 400 of training a pretrained sparse student model through transfer learning, in accordance with various embodiments. The pretrained sparse student model in FIG. 4 is the sparse student model 440 generated through the process 300 in FIG. 3. The process 400 may be the second stage of a two-stage training process. The process 400 may be performed by the training module 252 in FIG. 2.

The process 400 uses a task teacher model 450 and a training dataset 460 to further train the sparse student model 440 and generate a trained sparse student model 480. The task teacher model 450 has been trained, e.g., based on the training dataset 460 at a first time, indicated as T1 in FIG. 4. In some embodiments, the training dataset 460 is selected based on a task, e.g., a task to be performed by trained sparse student model 480. In some embodiments, the task may be a specific language modeling task, e.g., natural language inference, translation, question answering, text generation, and so on. The task teacher model 450 may have been trained for the task and can perform the task.

After the task teacher model 450 is trained, the training dataset 460 is input into the sparse student model 440 at a time T2. T2 is later than T1. Internal parameters of the sparse student model 440 are updated through knowledge distillation from the task teacher model 450. For instance, the internal parameters are updated to minimize a difference between one or more outputs of the sparse student model 440 and corresponding outputs of the task teacher model 450. Additionally or alternatively, the internal parameters can be updated to minimize a difference between determinations made by the sparse student model 440 and ground-truth labels of training samples in the training dataset. The knowledge learnt by the task teacher model 450 for performing the task is therefore injected into the sparse student model 440 during the training.

A sparsity pattern lock 470 is applied to the sparse student model 440 during the training of the sparse student model 440. The sparsity pattern lock 470 includes one or more sparsity masks, which are applied to individual sparse layers in the sparse student model 440. A sparse layer includes weights that are pruned in the pruning process in the process 300 shown in FIG. 3. The sparsity mask can lock the pruned weights so that the magnitudes of the pruned weights remain zero. During the process 400, even though some internal parameters of the sparse student model 440 are adjusted based on the knowledge from the task teacher model 450 and the training dataset 460, but the pruned weights are not adjusted due to the presence of the sparsity pattern lock 470.

The trained sparse student model 480 can be used to perform the task based on knowledge obtained from the task teacher model 450 and the training dataset 460. Also, by using the sparsity pattern lock 470 in the process 400, the trained sparse student model 480 may have the same or similar sparsity ratio as the sparse student model 440 and higher sparsity ratio than the task teacher model 450. In some embodiments, the trained sparse student model 480 can be executed by edge devices. Given the relatively high sparsity ratio, the execution of the trained sparse student model 480 requires less computing resources compared with the task teacher model 450.

Example Method of Training Neural Network

FIG. 5 is a flowchart showing a method of training a DNN, in accordance with various embodiments. The method 500 may be performed by the student network generator 250 in FIG. 2. Although the method 500 is described with reference to the flowchart illustrated in FIG. 5, many other methods for training a DNN may alternatively be used. For example, the order of execution of the steps in FIG. 5 may be changed. As another example, some of the steps may be changed, eliminated, or combined.

The student network generator 250 generates 510 the target neural network based on a first support neural network. In some embodiments, before generating the target neural network based on the first support neural network, the student network generator 250 may train the first support neural network based on the first training dataset. The first support neural network and the target neural network may include same layers.

The student network generator 250 modifies magnitudes of weights in the target neural network based on the first support neural network and a first training dataset. In some embodiments, the student network generator 250 may modify the magnitudes of the weights to minimize a difference between an output of the target neural network and an output of the first support neural network, a difference between determinations made by the target neural network based on training samples in the first training dataset and ground-truth labels of the training samples, or a combination of both differences.

The student network generator 250 prunes 530 one or more weights in the target neural network by changing values of the one or more weights to zero. In some embodiments, the student network generator 250 identifies lowest magnitude weights in one or more layers. The lowest magnitude weights have values lower than values of other weights in the one or more layers. The student network generator 250 changes the values of the lowest magnitude weights to zero. In some embodiments, the student network generator 250 prunes the one or more weights in the target neural network based on a predetermined sparsity ratio. The predetermined sparsity ratio indicates a ratio of a number of zero valued weights in the target neural network to a number of all weights in the target neural network. In an example, the predetermined sparsity ratio is 80%.

After pruning the one or more weights in the target neural network, the student network generator 250 further modifies 540 magnitudes of a subset of the weights in the target neural network based on a second support neural network and a second training dataset. The subset of the weights does not include the one or more weights. In some embodiments, the student network generator 250 may modify the magnitudes of the subset of weights to minimize a difference between an output of the target neural network and an output of the second support neural network, a difference between determinations made by the target neural network based on training samples in the second training dataset and ground-truth labels of the training samples, or a combination of both differences.

In some embodiments, the first training dataset and the second training dataset comprise different training samples. The second training dataset may include training samples selected based on a task to be performed by the target neural network. In some embodiments, before further modifying the magnitudes of the subset of the weights in the target neural network, the student network generator 250 trains the second support neural network based on the second training dataset.

In some embodiments, before further modifying the magnitudes of the subset of the weights in the target neural network, the student network generator 250 identifies a sparse layer in the target neural network. The sparse layer has at least one pruned weight. In some embodiments, the student network generator 250 may identity all the sparse layers in the target neural network. Each sparse layer has one or more pruned weights. The student network generator 250 applies a sparsity mask on the sparse layer. The sparsity mask is to prevent any change of the magnitude of a pruned weight from zero to a non-zero value. The student network generator 250 may generate the sparsity mask based on a sparsity pattern of the sparse layer. The sparsity pattern identifies the pruned weight and non-zero valued weights of the sparse layer.

Example DL Environment

FIG. 6 illustrates a DL environment 600, in accordance with various embodiments. The DL environment 600 includes a DL server 610 and a plurality of client devices 620 (individually referred to as client device 620). The DL server 610 is connected to the client devices 620 through a network 630. In other embodiments, the DL environment 600 may include fewer, more, or different components.

The DL server 610 trains DL models using neural networks. A neural network is structured like the human brain and consists of artificial neurons, also known as nodes. These nodes are stacked next to each other in three types of layers: input layer, hidden layer(s), and output layer. Data provides each node with information in the form of inputs. The node multiplies the inputs with random weights, calculates them, and adds a bias. Finally, nonlinear functions, also known as activation functions, are applied to determine which neuron to fire. The DL server 610 can use various types of neural networks, such as DNN, recurrent neural network (RNN), generative adversarial network (GAN), long short-term memory network (LSTMN), and so on. During the process of training the DL models, the neural networks use unknown elements in the input distribution to extract features, group objects, and discover useful data patterns. The DL models can be used to solve various problems, e.g., making predictions, classifying images, and so on. The DL server 610 may build DL models specific to particular types of problems that need to be solved. A DL model is trained to receive an input and outputs the solution to the particular problem.

In FIG. 6, the DL server 610 includes a DNN system 640, a database 650, and a distributer 660. The DNN system 640 trains DNNs. The DNNs can be used to process images, e.g., images captured by autonomous vehicles, medical devices, satellites, and so on. In an embodiment, a DNN receives an input image and outputs classifications of objects in the input image. An example of the DNNs is the DNN 100 described above in conjunction with FIG. 1 or the trained sparse student model 480 and the teacher model 430 described above in conjunction with FIG. 4. In some embodiments, the DNN system 640 trains DNNs through knowledge distillation, e.g., dense-connection based knowledge distillation. The trained DNNs may be used on low memory systems, like mobile phones, IOT edge devices, and so on. An embodiment of the DNN system 640 is the training system 200 described above in conjunction with FIG. 2.

The database 650 stores data received, used, generated, or otherwise associated with the DL server 610. For example, the database 650 stores a training dataset that the DNN system 640 uses to train DNNs. In an embodiment, the training dataset is an image gallery that can be used to train a DNN for classifying images. The training dataset may include data received from the client devices 620. As another example, the database 650 stores hyperparameters of the neural networks built by the DL server 610.

The distributer 660 distributes DL models generated by the DL server 610 to the client devices 620. In some embodiments, the distributer 660 receives a request for a DNN from a client device 620 through the network 630. The request may include a description of a problem that the client device 620 needs to solve. The request may also include information of the client device 620, such as information describing available computing resource on the client device. The information describing available computing resource on the client device 620 can be information indicating network bandwidth, information indicating available memory size, information indicating processing power of the client device 620, and so on. In an embodiment, the distributer may instruct the DNN system 640 to generate a DNN in accordance with the request. The DNN system 640 may generate a DNN based on the information in the request. For instance, the DNN system 640 can determine the structure of the DNN and/or train the DNN in accordance with the request.

In another embodiment, the distributer 660 may select the DNN from a group of pre-existing DNNs based on the request. The distributer 660 may select a DNN for a particular client device 620 based on the size of the DNN and available resources of the client device 620. In embodiments where the distributer 660 determines that the client device 620 has limited memory or processing power, the distributer 660 may select a compressed DNN for the client device 620, as opposed to an uncompressed DNN that has a larger size. The distributer 660 then transmits the DNN generated or selected for the client device 620 to the client device 620.

In some embodiments, the distributer 660 may receive feedback from the client device 620. For example, the distributer 660 receives new training data from the client device 620 and may send the new training data to the DNN system 640 for further training the DNN. As another example, the feedback includes an update of the available computer resource on the client device 620. The distributer 660 may send a different DNN to the client device 620 based on the update. For instance, after receiving the feedback indicating that the computing resources of the client device 620 have been reduced, the distributer 660 sends a DNN of a smaller size to the client device 620.

The client devices 620 receive DNNs from the distributer 660 and applies the DNNs to perform machine learning tasks, e.g., to solve problems or answer questions. In various embodiments, the client devices 620 input images into the DNNs and uses the output of the DNNs for various applications, e.g., visual reconstruction, augmented reality, robot localization and navigation, medical diagnosis, weather prediction, and so on. A client device 620 may be one or more computing devices capable of receiving user input as well as transmitting and/or receiving data via the network 630. In one embodiment, a client device 620 is a conventional computer system, such as a desktop or a laptop computer. Alternatively, a client device 620 may be a device having computer functionality, such as a personal digital assistant (PDA), a mobile telephone, a smartphone, an autonomous vehicle, or another suitable device. A client device 620 is configured to communicate via the network 630. In one embodiment, a client device 620 executes an application allowing a user of the client device 620 to interact with the DL server 610 (e.g., the distributer 660 of the DL server 610). The client device 620 may request DNNs or send feedback to the distributer 660 through the application. For example, a client device 620 executes a browser application to enable interaction between the client device 620 and the DL server 610 via the network 630. In another embodiment, a client device 620 interacts with the DL server 610 through an application programming interface (API) running on a native operating system of the client device 620, such as IOS® or ANDROID™.

In an embodiment, a client device 620 is an integrated computing device that operates as a standalone network-enabled device. For example, the client device 620 includes display, speakers, microphone, camera, and input device. In another embodiment, a client device 620 is a computing device for coupling to an external media device such as a television or other external display and/or audio output system. In this embodiment, the client device 620 may couple to the external media device via a wireless interface or wired interface (e.g., an HDMI cable) and may utilize various functions of the external media device such as its display, speakers, microphone, camera, and input devices. Here, the client device 620 may be configured to be compatible with a generic external media device that does not have specialized software, firmware, or hardware specifically for interacting with the client device 620.

The network 630 supports communications between the DL server 610 and client devices 620. The network 630 may comprise any combination of local area and/or wide area networks, using both wired and/or wireless communication systems. In one embodiment, the network 630 may use standard communications technologies and/or protocols. For example, the network 630 may include communication links using technologies such as Ethernet, 8010.11, worldwide interoperability for microwave access (WiMAX), 3G, 4G, code division multiple access (CDMA), digital subscriber line (DSL), etc. Examples of networking protocols used for communicating via the network 630 may include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 630 may be represented using any suitable format, such as hypertext markup language (HTML) or extensible markup language (XML). In some embodiments, all or some of the communication links of the network 630 may be encrypted using any suitable technique or techniques.

Example DNN System

Figure 7:
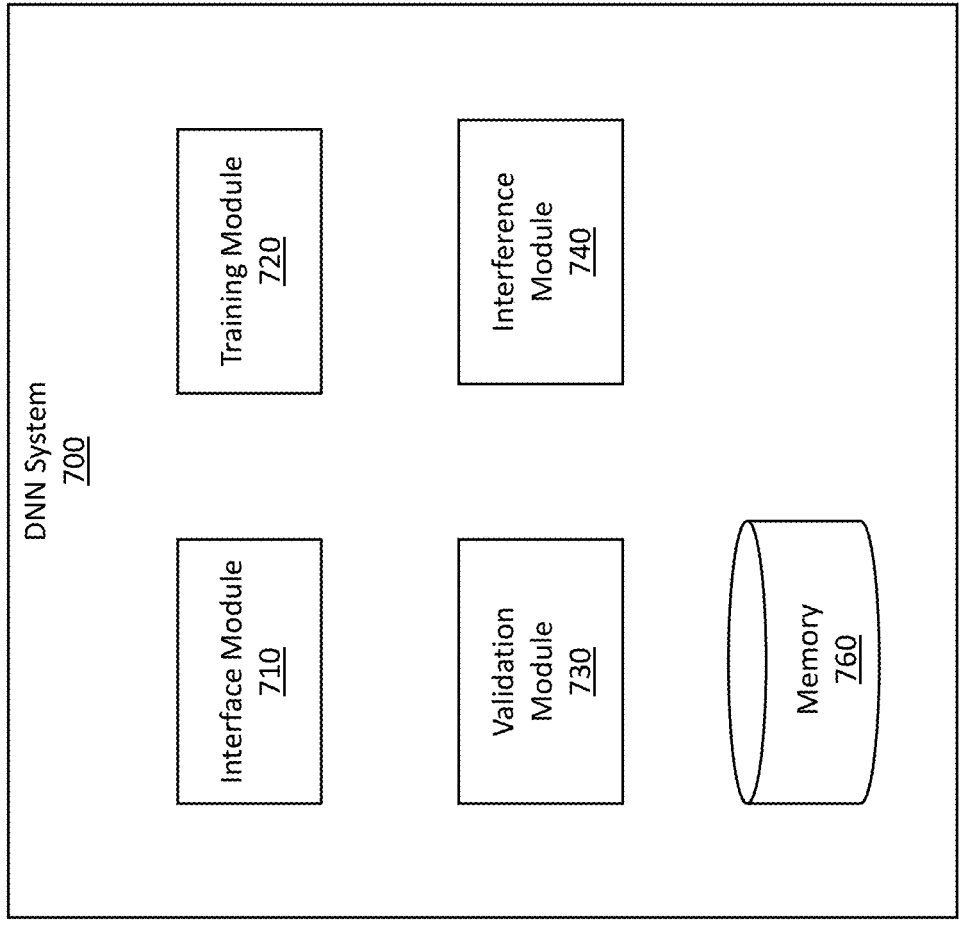
FIG. 7 is a block diagram of an example DNN system, in accordance with various embodiments.

FIG. 7 is a block diagram of an example DNN system 700, in accordance with various embodiments. The DNN system 700 trains DNNs for various tasks, such as image classification, learning relationships between biological cells (e.g., DNA, proteins, etc.), control behaviors for devices (e.g., robots, machines, etc.), and so on. The DNN system 700 includes an interface module 710, a training module 720, a validation module 730, an inference module 740, and a memory 750. In other embodiments, alternative configurations, different or additional components may be included in the DNN system 700. Further, functionality attributed to a component of the DNN system 700 may be accomplished by a different component included in the DNN system 700 or a different system.

The interface module 710 facilitates communications of the DNN system 700 with other systems. For example, the interface module 710 establishes communications between the DNN system 700 with an external database to receive data that can be used to train DNNs or input into DNNs to perform tasks. As another example, the interface module 710 supports the DNN system 700 to distribute DNNs to other systems, e.g., computing devices configured to apply DNNs to perform tasks.

The training module 720 trains DNNs by using a training dataset. The training module 720 forms the training dataset. In an embodiment where the training module 720 trains an DNN to recognize objects in images, the training dataset includes training images and training labels. The training labels describe ground-truth classifications of objects in the training images. In some embodiments, each label in the training dataset corresponds to an object in a training image. In some embodiments, a part of the training dataset may be used to initially train the DNN, and the rest of the training dataset may be held back as a validation subset used by the validation module 730 to validate performance of a trained DNN. The portion of the training dataset not including the tuning subset and the validation subset may be used to train the DNN.

The training module 720 also determines hyperparameters for training the DNN. Hyperparameters are variables specifying the DNN training process. Hyperparameters are different from parameters inside the DNN (e.g., weights of filters). In some embodiments, hyperparameters include variables determining the architecture of the DNN, such as number of hidden layers, etc. Hyperparameters also include variables which determine how the DNN is trained, such as batch size, number of epochs, etc. A batch size defines the number of training samples to work through before updating the parameters of the DNN. The batch size is the same as or smaller than the number of samples in the training dataset. The training dataset can be divided into one or more batches. The number of epochs defines how many times the entire training dataset is passed forward and backwards through the entire network. The number of epochs defines the number of times that the DL algorithm works through the entire training dataset. One epoch means that each training sample in the training dataset has had an opportunity to update the parameters inside the DNN. An epoch may include one or more batches. The number of epochs may be 7, 70, 500, 700, or even larger.

The training module 720 defines the architecture of the DNN, e.g., based on some of the hyperparameters. The architecture of the DNN includes an input layer, an output layer, and a plurality of hidden layers. The input layer of an DNN may include tensors (e.g., a multidimensional array) specifying attributes of the input image, such as the height of the input image, the width of the input image, and the depth of the input image (e.g., the number of bits specifying the color of a pixel in the input image). The output layer includes labels of objects in the input layer. The hidden layers are layers between the input layer and output layer. The hidden layers include one or more convolutional layers and one or more other types of layers, such as pooling layers, fully connected layers, normalization layers, softmax or logistic layers, and so on. The convolutional layers of the DNN abstract the input image to a feature map that is represented by a tensor specifying the feature map height, the feature map width, and the feature map channels (e.g., red, green, blue images include three channels). A pooling layer is used to reduce the spatial volume of input image after convolution. It is used between two convolution layers. A fully connected layer involves weights, biases, and neurons. It connects neurons in one layer to neurons in another layer. It is used to classify images between different category by training.

In the process of defining the architecture of the DNN, the training module 720 also adds an activation function to a hidden layer or the output layer. An activation function of a layer transforms the weighted sum of the input of the layer to an output of the layer. The activation function may be, for example, a rectified linear unit activation function, a tangent activation function, or other types of activation functions.

After the training module 720 defines the architecture of the DNN, the training module 720 inputs a training dataset into the DNN. The training dataset includes a plurality of training samples. An example of a training sample includes an object in an image and a ground-truth label of the object. The training module 720 modifies the parameters inside the DNN ("internal parameters of the DNN") to minimize the error between labels of the training objects that are generated by the DNN and the ground-truth labels of the objects. The internal parameters include weights of filters in the convolutional layers of the DNN. In some embodiments, the training module 720 uses a cost function to minimize the error.

The training module 720 may train the DNN for a predetermined number of epochs. The number of epochs is a hyperparameter that defines the number of times that the DL algorithm will work through the entire training dataset. One epoch means that each sample in the training dataset has had an opportunity to update internal parameters of the DNN. After the training module 720 finishes the predetermined number of epochs, the training module 720 may stop updating the parameters in the DNN. The DNN having the updated parameters is referred to as a trained DNN.

The validation module 730 verifies accuracy of trained DNNs. In some embodiments, the validation module 730 inputs samples in a validation dataset into a trained DNN and uses the outputs of the DNN to determine the model accuracy. In some embodiments, a validation dataset may be formed of some or all the samples in the training dataset. Additionally or alternatively, the validation dataset includes additional samples, other than those in the training datasets. In some embodiments, the validation module 730 determines may determine an accuracy score measuring the precision, recall, or a combination of precision and recall of the DNN. The validation module 730 may use the following metrics to determine the accuracy score: Precision=TP/(TP+FP) and Recall=TP/(TP+FN), where precision may be how many the reference classification model correctly predicted (TP or true positives) out of the total it predicted (TP+FP or false positives), and recall may be how many the reference classification model correctly predicted (TP) out of the total number of objects that did have the property in question (TP+FN or false negatives). The F-score (F-score=2*PR/(P+R)) unifies precision and recall into a single measure.

The validation module 730 may compare the accuracy score with a threshold score. In an example where the validation module 730 determines that the accuracy score of the augmented model is lower than the threshold score, the validation module 730 instructs the training module 720 to re-train the DNN. In one embodiment, the training module 720 may iteratively re-train the DNN until the occurrence of a stopping condition, such as the accuracy measurement indication that the DNN may be sufficiently accurate, or a number of training rounds having taken place.

The inference module 740 applies the trained or validated DNN to perform tasks. For instance, the inference module 740 inputs images into the DNN. The DNN outputs classifications of objects in the images. As an example, the DNN may be provisioned in a security setting to detect malicious or hazardous objects in images captured by security cameras. As another example, the DNN may be provisioned to detect objects (e.g., road signs, hazards, humans, pets, etc.) in images captured by cameras of an autonomous vehicle. The input to the DNN may be formatted according to a predefined input structure mirroring the way that the training dataset was provided to the DNN. The DNN may generate an output structure which may be, for example, a classification of the image, a listing of detected objects, a boundary of detected objects, or the like. In some embodiments, the inference module 740 distributes the DNN to other systems, e.g., computing devices in communication with the DNN system 700, for the other systems to apply the DNN to perform the tasks.

The memory 750 stores data received, generated, used, or otherwise associated with the DNN system 700. For example, the memory 750 stores the datasets used by the training module 720 and validation module 730. The memory 750 may also store data generated by the training module 720 and validation module 730, such as the hyperparameters for training DNNs, internal parameters of trained DNNs (e.g., values of tunable parameters of FALUs), etc. In the embodiment of FIG. 7, the memory 750 is a component of the DNN system 700. In other embodiments, the memory 750 may be external to the DNN system 700 and communicate with the DNN system 700 through a network.

Example Computing Device

Figure 8:
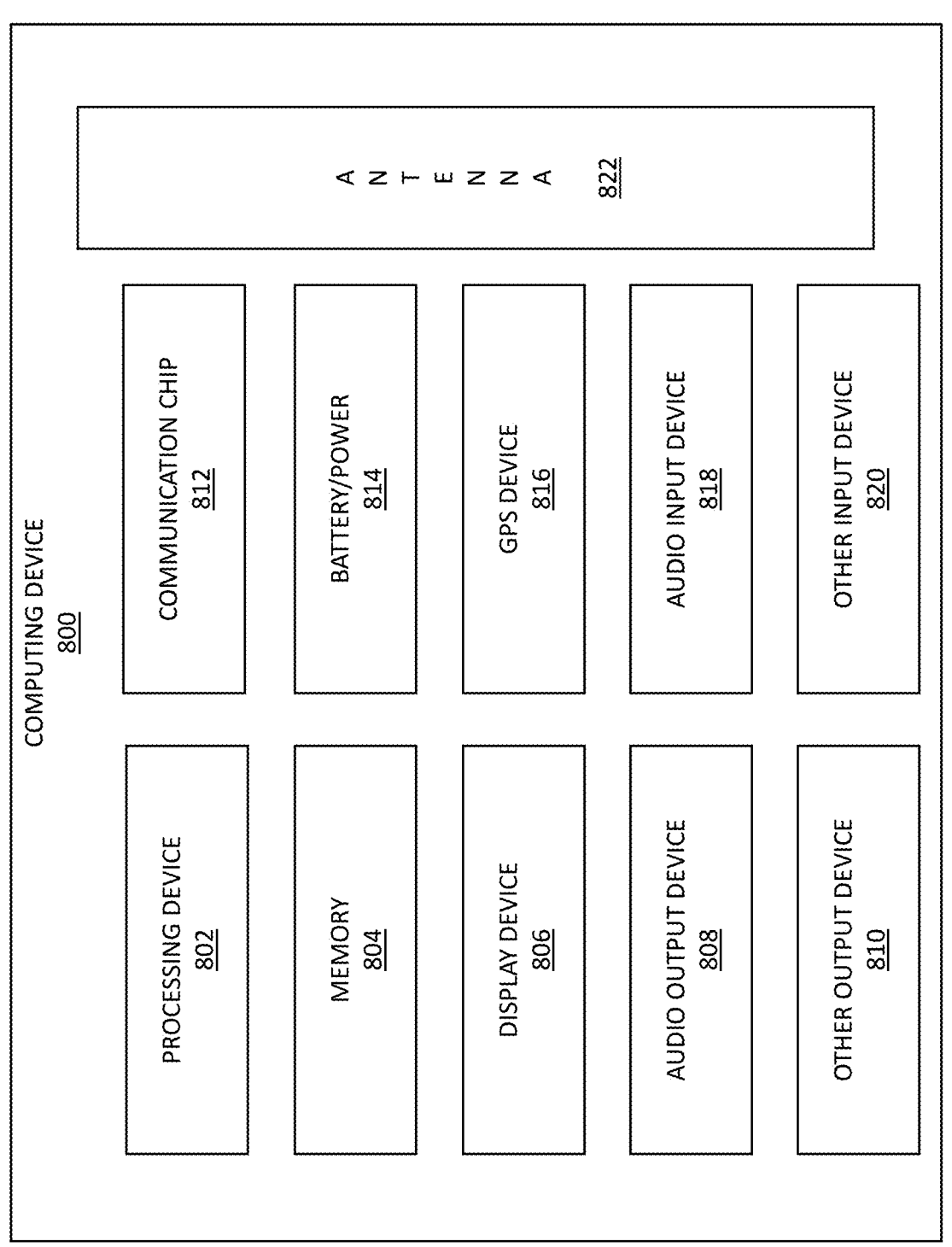
FIG. 8 is a block diagram of an example computing device, in accordance with various embodiments.

FIG. 8 is a block diagram of an example computing device 800, in accordance with various embodiments. A number of components are illustrated in FIG. 8 as included in the computing device 800, but any one or more of these components may be omitted or duplicated, as suitable for the application. In some embodiments, some or all of the components included in the computing device 800 may be attached to one or more motherboards. In some embodiments, some or all of these components are fabricated onto a single system on a chip (SoC) die. Additionally, in various embodiments, the computing device 800 may not include one or more of the components illustrated in FIG. 8, but the computing device 800 may include interface circuitry for coupling to the one or more components. For example, the computing device 800 may not include a display device 806, but may include display device interface circuitry (e.g., a connector and driver circuitry) to which a display device 806 may be coupled. In another set of examples, the computing device 800 may not include an audio input device 818 or an audio output device 808 but may include audio input or output device interface circuitry (e.g., connectors and supporting circuitry) to which an audio input device 818 or audio output device 808 may be coupled.

The computing device 800 may include a processing device 802 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 802 may include one or more digital signal processors (DSPs), application-specific ICs (ASICs), CPUs, GPUs, cryptoprocessors (specialized processors that execute cryptographic algorithms within hardware), server processors, or any other suitable processing devices. The computing device 800 may include a memory 804, which may itself include one or more memory devices such as volatile memory (e.g., DRAM), nonvolatile memory (e.g., read-only memory (ROM)), flash memory, solid state memory, and/or a hard drive. In some embodiments, the memory 804 may include memory that shares a die with the processing device 802. In some embodiments, the memory 804 includes one or more non-transitory computer-readable media storing instructions executable to perform operations for training DNNs, e.g., the method 500 described above in conjunction with FIG. 5 or the operations performed by the training system 200 described above in conjunction with FIG. 2. The instructions stored in the one or more non-transitory computer-readable media may be executed by the processing device 802.

In some embodiments, the computing device 800 may include a communication chip 812 (e.g., one or more communication chips). For example, the communication chip 812 may be configured for managing wireless communications for the transfer of data to and from the computing device 800. The term "wireless" and its derivatives may be used to describe circuits, devices, DNN accelerators, methods, techniques, communications channels, etc., that may communicate data through the use of modulated electromagnetic radiation through a nonsolid medium. The term does not imply that the associated devices do not contain any wires, although in some embodiments they might not.

The communication chip 812 may implement any of a number of wireless standards or protocols, including but not limited to Institute for Electrical and Electronic Engineers (IEEE) standards including Wi-Fi (IEEE 802.13 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 812 may operate in accordance with a Global system for Mobile Communication (GSM), General Packet Radio Service (GPRS), Universal Mobile Telecommunications system (UMTS), High Speed Packet Access (HSPA), Evolved HSPA (E-HSPA), or LTE network. The communication chip 812 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 812 may operate in accordance with CDMA, Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 812 may operate in accordance with other wireless protocols in other embodiments. The computing device 800 may include an antenna 822 to facilitate wireless communications and/or to receive other wireless communications (such as AM or FM radio transmissions).

In some embodiments, the communication chip 812 may manage wired communications, such as electrical, optical, or any other suitable communication protocols (e.g., the Ethernet). As noted above, the communication chip 812 may include multiple communication chips. For instance, a first communication chip 812 may be dedicated to shorter-range wireless communications such as Wi-Fi or Bluetooth, and a second communication chip 812 may be dedicated to longer-range wireless communications such as global positioning system (GPS), EDGE, GPRS, CDMA, WiMAX, LTE, EV-DO, or others. In some embodiments, a first communication chip 812 may be dedicated to wireless communications, and a second communication chip 812 may be dedicated to wired communications.

The computing device 800 may include battery/power circuitry 814. The battery/power circuitry 814 may include one or more energy storage devices (e.g., batteries or capacitors) and/or circuitry for coupling components of the computing device 800 to an energy source separate from the computing device 800 (e.g., AC line power).

The computing device 800 may include a display device 806 (or corresponding interface circuitry, as discussed above). The display device 806 may include any visual indicators, such as a heads-up display, a computer monitor, a projector, a touchscreen display, a liquid crystal display (LCD), a light-emitting diode display, or a flat panel display, for example.

The computing device 800 may include an audio output device 808 (or corresponding interface circuitry, as discussed above). The audio output device 808 may include any device that generates an audible indicator, such as speakers, headsets, or earbuds, for example.

The computing device 800 may include an audio input device 818 (or corresponding interface circuitry, as discussed above). The audio input device 818 may include any device that generates a signal representative of a sound, such as microphones, microphone arrays, or digital instruments (e.g., instruments having a musical instrument digital interface (MIDI) output).

The computing device 800 may include a GPS device 816 (or corresponding interface circuitry, as discussed above). The GPS device 816 may be in communication with a satellite-based system and may receive a location of the computing device 800, as known in the art.

The computing device 800 may include another output device 813 (or corresponding interface circuitry, as discussed above). Examples of the other output device 813 may include an audio codec, a video codec, a printer, a wired or wireless transmitter for providing information to other devices, or an additional storage device.

The computing device 800 may include another input device 820 (or corresponding interface circuitry, as discussed above). Examples of the other input device 820 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 800 may have any desired form factor, such as a handheld or mobile computing system (e.g., a cell phone, a smart phone, a mobile internet device, a music player, a tablet computer, a laptop computer, a netbook computer, an ultrabook computer, a PDA, an ultramobile personal computer, etc.), a desktop computing system, a server or other networked computing component, a printer, a scanner, a monitor, a set-top box, an entertainment control unit, a vehicle control unit, a digital camera, a digital video recorder, or a wearable computing system. In some embodiments, the computing device 800 may be any other electronic device that processes data.

Select Examples

The following paragraphs provide various examples of the embodiments disclosed herein.

Example 1 provides a method for training a target neural network, the method including generating the target neural network based on a first support neural network; modifying magnitudes of weights in the target neural network based on the first support neural network and a first training dataset; pruning one or more weights in the target neural network by changing magnitudes of the one or more weights to zero; and after pruning the one or more weights in the target neural network, further modifying magnitudes of a subset of the weights in the target neural network based on a second support neural network and a second training dataset, where the subset of the weights does not include the one or more weights.

Example 2 provides the method of example 1, where the first training dataset and the second training dataset include different training samples.

Example 3 provides the method of example 1 or 2, where the second training dataset includes training samples selected based on a task to be performed by the target neural network.

Example 4 provides the method of any of the preceding examples, where pruning the one or more weights in the target neural network includes identifying lowest magnitude weights in one or more layers of the target neural network, where the lowest magnitude weights have magnitudes lower than magnitudes of other weights in the one or more layers; and changing the magnitudes of the lowest magnitude weights to zero.

Example 5 provides the method of any of the preceding examples, where pruning the one or more weights in the target neural network includes pruning the one or more weights in the target neural network based on a predetermined sparsity ratio, where the predetermined sparsity ratio indicates a ratio of a number of zero valued weights in the target neural network to a number of all weights in the target neural network.

Example 6 provides the method of any of the preceding examples, further including before further modifying the magnitudes of the subset of the weights in the target neural network, identifying a sparse layer in the target neural network, where the sparse layer has a weight of the one or more weights, and applying a sparsity mask on the sparse layer, where the sparsity mask is to prevent modification of a magnitude of the weight.

Example 7 provides the method of example 6, further including generating the sparsity mask based on a sparsity pattern of the sparse layer, where the sparsity pattern identifies the weight and one or more non-zero valued weights of the sparse layer.

Example 8 provides the method of any of the preceding examples, where the first support neural network and the target neural network include same layers.

Example 9 provides the method of any of the preceding examples, further including before generating the target neural network based on the first support neural network, training the first support neural network based on the first training dataset.

Example 10 provides the method of any of the preceding examples, further including before further modifying magnitudes of a subset of the weights in the target neural network based on a second support neural network, training the second support neural network based on the second training dataset.

Example 11 provides one or more non-transitory computer-readable media storing instructions executable to perform operations for training a target neural network, the operations including generating the target neural network based on a first support neural network; modifying magnitudes of weights in the target neural network based on the first support neural network and a first training dataset; pruning one or more weights in the target neural network by changing magnitudes of the one or more weights to zero; and after pruning the one or more weights in the target neural network, further modifying magnitudes of a subset of the weights in the target neural network based on a second support neural network and a second training dataset, where the subset of the weights does not include the one or more weights.

Example 12 provides the one or more non-transitory computer-readable media of example 11, where the first training dataset and the second training dataset include different training samples.

Example 13 provides the one or more non-transitory computer-readable media of example 11 or 12, where the second training dataset includes training samples selected based on a task to be performed by the target neural network.

Example 14 provides the one or more non-transitory computer-readable media of any one of examples 11-13, where pruning the one or more weights in the target neural network includes identifying lowest magnitude weights in one or more layers of the target neural network, where the lowest magnitude weights have magnitudes lower than magnitudes of other weights in the one or more layers; and changing the magnitudes of the lowest magnitude weights to zero.

Example 15 provides the one or more non-transitory computer-readable media of any one of examples 11-14, where pruning the one or more weights in the target neural network includes pruning the one or more weights in the target neural network based on a predetermined sparsity ratio, where the predetermined sparsity ratio indicates a ratio of a number of zero valued weights in the target neural network to a number of all weights in the target neural network.

Example 16 provides the one or more non-transitory computer-readable media of any one of examples 11-15, where the operations further include before further modifying the magnitudes of the subset of the weights in the target neural network, identifying a sparse layer in the target neural network, where the sparse layer has a weight of the one or more weights, and applying a sparsity mask on the sparse layer, where the sparsity mask is to prevent modification of a magnitude of the weight.

Example 17 provides the one or more non-transitory computer-readable media of example 16, where the operations further include generating the sparsity mask based on a sparsity pattern of the sparse layer, where the sparsity pattern identifies the weight and one or more non-zero valued weights of the sparse layer.

Example 18 provides the one or more non-transitory computer-readable media of any one of examples 11-17, where the first support neural network and the target neural network include same layers.

Example 19 provides the one or more non-transitory computer-readable media of any one of examples 11-18, where the operations further include before generating the target neural network based on the first support neural network, training the first support neural network based on the first training dataset.

Example 20 provides the one or more non-transitory computer-readable media of any one of examples 11-19, where the operations further include before further modifying magnitudes of a subset of the weights in the target neural network based on a second support neural network, training the second support neural network based on the second training dataset.

Example 21 provides a n apparatus for training a target neural network, the apparatus including a computer processor for executing computer program instructions; and a non-transitory computer-readable memory storing computer program instructions executable by the computer processor to perform operations including generating the target neural network based on a first support neural network, modifying magnitudes of weights in the target neural network based on the first support neural network and a first training dataset, pruning one or more weights in the target neural network by changing magnitudes of the one or more weights to zero, and after pruning the one or more weights in the target neural network, further modifying magnitudes of a subset of the weights in the target neural network based on a second support neural network and a second training dataset, where the subset of the weights does not include the one or more weights.

Example 22 provides the apparatus of example 21, where the second training dataset includes training samples selected based on a task to be performed by the target neural network.

Example 23 provides the apparatus of example 21 or 22, where pruning the one or more weights in the target neural network includes identifying lowest magnitude weights in one or more layers of the target neural network, where the lowest magnitude weights have magnitudes lower than magnitudes of other weights in the one or more layers; and changing the magnitudes of the lowest magnitude weights to zero.

Example 24 provides the apparatus of any one of examples 21-23, where the operations further include before further modifying the magnitudes of the subset of the weights in the target neural network, identifying a sparse layer in the target neural network, where the sparse layer has a weight of the one or more weights, and applying a sparsity mask on the sparse layer, where the sparsity mask is to prevent modification of a magnitude of the weight.

Example 25 provides the apparatus of example 24, where the operations further include generating the sparsity mask based on a sparsity pattern of the sparse layer, where the sparsity pattern identifies the weight and one or more non-zero valued weights of the sparse layer.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. A method for training a target neural network, the method comprising:

generating the target neural network based on a first support neural network;

modifying magnitudes of weights in the target neural network based on the first support neural network and a first training dataset;

pruning one or more weights in the target neural network by changing magnitudes of the one or more weights to zero; and after pruning the one or more weights in the target neural network, further modifying magnitudes of a subset of the weights in the target neural network based on a second support neural network and a second training dataset, wherein the subset of the weights does not include the one or more weights.

2. The method of claim 1, wherein the first training dataset and the second training dataset comprise different training samples.

3. The method of claim 1, wherein the second training dataset comprises training samples selected based on a task to be performed by the target neural network.

4. The method of claim 1, wherein pruning the one or more weights in the target neural network comprises:

identifying lowest magnitude weights in one or more layers of the target neural network, wherein the lowest magnitude weights have magnitudes lower than magnitudes of other weights in the one or more layers; and changing the magnitudes of the lowest magnitude weights to zero.

5. The method of claim 1, wherein pruning the one or more weights in the target neural network comprises:

pruning the one or more weights in the target neural network based on a predetermined sparsity ratio, wherein the predetermined sparsity ratio indicates a ratio of a number of zero valued weights in the target neural network to a number of all weights in the target neural network.

6. The method of claim 1, further comprising:

before further modifying the magnitudes of the subset of the weights in the target neural network, identifying a sparse layer in the target neural network, wherein the sparse layer has a weight of the one or more weights, and applying a sparsity mask on the sparse layer, wherein the sparsity mask is to prevent modification of a magnitude of the weight.

7. The method of claim 6, further comprising:

generating the sparsity mask based on a sparsity pattern of the sparse layer, wherein the sparsity pattern identifies the weight and one or more non-zero valued weights of the sparse layer.

8. The method of claim 1, wherein the first support neural network and the target neural network comprise a same number of layers.

9. The method of claim 1, further comprising:

before generating the target neural network based on the first support neural network, training the first support neural network based on the first training dataset.

10. The method of claim 1, further comprising:

before further modifying magnitudes of a subset of the weights in the target neural network based on a second support neural network, training the second support neural network based on the second training dataset.

11. One or more non-transitory computer-readable media storing instructions executable to perform operations for training a target neural network, the operations comprising:

generating the target neural network based on a first support neural network;

modifying magnitudes of weights in the target neural network based on the first support neural network and a first training dataset;

pruning one or more weights in the target neural network by changing magnitudes of the one or more weights to zero; and after pruning the one or more weights in the target neural network, further modifying magnitudes of a subset of the weights in the target neural network based on a second support neural network and a second training dataset, wherein the subset of the weights does not include the one or more weights.

12. The one or more non-transitory computer-readable media of claim 11, wherein the first training dataset and the second training dataset comprise different training samples.

13. The one or more non-transitory computer-readable media of claim 11, wherein the second training dataset comprises training samples selected based on a task to be performed by the target neural network.

14. The one or more non-transitory computer-readable media of claim 11, wherein pruning the one or more weights in the target neural network comprises:

identifying lowest magnitude weights in one or more layers of the target neural network, wherein the lowest magnitude weights have magnitudes lower than magnitudes of other weights in the one or more layers; and changing the magnitudes of the lowest magnitude weights to zero.

15. The one or more non-transitory computer-readable media of claim 11, wherein pruning the one or more weights in the target neural network comprises:

pruning the one or more weights in the target neural network based on a predetermined sparsity ratio, wherein the predetermined sparsity ratio indicates a ratio of a number of zero valued weights in the target neural network to a number of all weights in the target neural network.

16. The one or more non-transitory computer-readable media of claim 11, wherein the operations further comprise:

before further modifying the magnitudes of the subset of the weights in the target neural network, identifying a sparse layer in the target neural network, wherein the sparse layer has a weight of the one or more weights, and applying a sparsity mask on the sparse layer, wherein the sparsity mask is to prevent modification of a magnitude of the weight.

17. The one or more non-transitory computer-readable media of claim 16, wherein the operations further comprise:

generating the sparsity mask based on a sparsity pattern of the sparse layer, wherein the sparsity pattern identifies the weight and one or more non-zero valued weights of the sparse layer.

18. The one or more non-transitory computer-readable media of claim 11, wherein the first support neural network and the target neural network comprise a same number of layers.

19. The one or more non-transitory computer-readable media of claim 11, wherein the operations further comprise:

before generating the target neural network based on the first support neural network, training the first support neural network based on the first training dataset.

20. The one or more non-transitory computer-readable media of claim 11, wherein the operations further comprise:

before further modifying magnitudes of a subset of the weights in the target neural network based on a second support neural network, training the second support neural network based on the second training dataset.

21. An apparatus for training a target neural network, the apparatus comprising:

a computer processor for executing computer program instructions; and a non-transitory computer-readable memory storing computer program instructions executable by the computer processor to perform operations comprising:

generating the target neural network based on a first support neural network, modifying magnitudes of weights in the target neural network based on the first support neural network and a first training dataset, pruning one or more weights in the target neural network by changing magnitudes of the one or more weights to zero, and after pruning the one or more weights in the target neural network, further modifying magnitudes of a subset of the weights in the target neural network based on a second support neural network and a second training dataset, wherein the subset of the weights does not include the one or more weights.

22. The apparatus of claim 21, wherein the second training dataset comprises training samples selected based on a task to be performed by the target neural network.

23. The apparatus of claim 21, wherein pruning the one or more weights in the target neural network comprises:

identifying lowest magnitude weights in one or more layers of the target neural network, wherein the lowest magnitude weights have magnitudes lower than magnitudes of other weights in the one or more layers; and changing the magnitudes of the lowest magnitude weights to zero.

24. The apparatus of claim 21, wherein the operations further comprise:

before further modifying the magnitudes of the subset of the weights in the target neural network, identifying a sparse layer in the target neural network, wherein the sparse layer has a weight of the one or more weights, and applying a sparsity mask on the sparse layer, wherein the sparsity mask is to prevent modification of a magnitude of the weight.

25. The apparatus of claim 24, wherein the operations further comprise:

generating the sparsity mask based on a sparsity pattern of the sparse layer, wherein the sparsity pattern identifies the weight and one or more non-zero valued weights of the sparse layer.

* * * * *